US009961218B2

(12) United States Patent
Ishibashi et al.

(10) Patent No.: US 9,961,218 B2
(45) Date of Patent: May 1, 2018

(54) COMMUNICATION SYSTEM FOR EXECUTING COORDINATED OPERATIONS USING IMAGE PROCESSING APPARATUS, SERVER AND MOBILE TERMINAL DEVICE

(71) Applicant: BROTHER KOGYO KABUSHIKI KAISHA, Nagoya, Aichi (JP)

(72) Inventors: Masayuki Ishibashi, Aichi (JP); Ken Saito, Tokoname (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days. days.

(21) Appl. No.: 15/051,721

(22) Filed: Feb. 24, 2016

(65) Prior Publication Data

US 2016/0255223 A1 Sep. 1, 2016

(30) Foreign Application Priority Data

Feb. 27, 2015 (JP) ................................. 2015-038039

(51) Int. Cl.
*H04N 1/44* (2006.01)
*H04N 1/00* (2006.01)
(Continued)

(52) U.S. Cl.
CPC ..... *H04N 1/00482* (2013.01); *H04N 1/00244* (2013.01); *H04N 1/00307* (2013.01);
(Continued)

(58) Field of Classification Search
CPC ............. H04N 1/00482; H04N 1/4433; H04N 1/00973; H04N 1/00244; H04N 1/32747;
(Continued)

(56) References Cited

U.S. PATENT DOCUMENTS

2012/0113468 A1 5/2012 Urakawa
2016/0055477 A1* 2/2016 Guerin ................. G06Q 20/202
705/21

FOREIGN PATENT DOCUMENTS

JP 2000-222318 A 8/2000
JP 2012-113700 A 6/2012
JP 2013-125514 A 6/2013

* cited by examiner

*Primary Examiner* — Eric A Rust
(74) *Attorney, Agent, or Firm* — Scully, Scott, Murphy & Presser, P.C.

(57) ABSTRACT

A communication system including an image processing apparatus configured to receive N-th operation definition information from a server, when the N-th operation definition information includes an option selecting instruction, set a user interface to be allowed to accept an option selecting operation, and transmit to the server, next-operation request information being for requesting the server to transmit (N+1)th operation definition information, when the N-th operation definition information includes an operation instruction, control an image processor to perform an operation as instructed by the operation instruction, set an apparatus-side network interface to be allowed to receive from a mobile terminal device, shortcut information indicating that a coordinated operation is started from an M-th unit operation of the plurality of unit operations, and when receiving the shortcut information from the mobile terminal device via the apparatus-side network interface, transmit the shortcut information to the server via the apparatus-side network interface.

23 Claims, 13 Drawing Sheets

(51) Int. Cl.
*H04N 1/327* (2006.01)
*H04W 4/00* (2009.01)
(52) U.S. Cl.
CPC ..... *H04N 1/00933* (2013.01); *H04N 1/00954* (2013.01); *H04N 1/00973* (2013.01); *H04N 2201/006* (2013.01); *H04N 2201/0013* (2013.01); *H04N 2201/0039* (2013.01); *H04N 2201/0094* (2013.01)
(58) Field of Classification Search
CPC . H04N 2201/006; H04W 12/06; H04W 4/008
USPC ..................................... 358/1.13, 1.14, 1.15
See application file for complete search history.

| SHORTCUT ID | SHORTCUT NAME | OPTION INFORMATION |
|---|---|---|
| 001-2 | Scan to Cloud | option["Upload Destination"] = "Cloud" |
| 001-3 | Scan to FTP | option["Upload Destination"] = "FTP"<br>option["Token"] = " " |
| 002-3 | Quotation Template Print | option["Download Source"] = "Cloud"<br>option["Size"] = "A4" |

FIG. 3

| |
|---|
| Command1_template.xml |
| Command2_template.xml |
| Command3_template.xml |
| Command4_template.xml |
| Command5_template.xml |
| Command6_template.xml |
| ⋮ |

[command1.xml]

```xml
<?xml version="1.0" encoding="UTF-8" ?>
<Command>
   <OptionDisplay>
      <OptionTitle>Upload Destination</OptionTitle>
         <Option>Storage</Option>
         <Option>Cloud</Option>
         <Option>FTP</Option>
   </OptionDisplay>
<SelectionCompletion>OK<SelectionCompletion>
<CommunicationURL>./return001_01</CommunicationURL>
</Command>
```

FIG. 5A

[command4.xml]

```xml
<?xml version="1.0" encoding="UTF-8" ?>
<Command>
   <NextURL>./command5.xml</NextURL>
   <Text>
      <Title>User ID</Title>
   </Text>
   <Text>
      <Title>Password</Title>
   </Text>
<SelectionCompletion>OK<SelectionCompletion>
<CommunicationURL>./return001_04</CommunicationURL>
</Command>
```

FIG. 5B

[command5.xml]

```xml
<?xml version="1.0" encoding="UTF-8" ?>
<Command>
  <OptionDisplay>
    <OptionTitle>File Format</OptionTitle>
      <Option>TIFF</Option>
      <Option>PDF</Option>
    <OptionTitle>Scanning Resolution</OptionTitle>
      <Option>Low</Option>
      <Option>Middle</Option>
      <Option>High</Option>
  </OptionDisplay>
<SelectionCompletion>OK<SelectionCompletion>
<CommunicationURL>./return001_05</CommunicationURL>
</Command>
```

FIG. 6

[command6.xml]

```xml
<?xml version="1.0" encoding="UTF-8" ?>
<Command>
  <ScanTransmission>
    <TransmissionSetting>
      <TransmissionProtocol>FTP</TransmissionProtocol>
      <TransmissionAddress>10.145.40.2</TransmissionAddress>
      <FolderName>test</FolderName>
      <UserName>abc</UserName>
      <Password>123</Password>
      <FileFormat>PDF</FileFormat>
      <Resolution>Low</Resolution>
    </TransmissionSetting>
  </ScanTransmission>
  <CommunicationURL>./return001_99</CommunicationURL>
</Command>
```

FIG. 7

COMMUNICATION SYSTEM FOR EXECUTING COORDINATED OPERATIONS USING IMAGE PROCESSING APPARATUS, SERVER AND MOBILE TERMINAL DEVICE

CROSS-REFERENCE TO RELATED APPLICATION

This application claims priority under 35 U.S.C. § 119 from Japanese Patent Application No. 2015-038039 filed on Feb. 27, 2015. The entire subject matter of the application is incorporated herein by reference.

BACKGROUND

Technical Field

The following description relates to one or more aspects of a communication system configured to cause an image processing apparatus to execute a coordinated operation in cooperation with a server.

Related Art

A system has been known that is configured to cause an image processing apparatus to execute a coordinated operation in cooperation with a server. For instance, in a known service cooperation system, a coordinated operation is achieved when an image processing apparatus performs a plurality of unit operations according to a plurality of pieces of definition information sequentially transmitted by a server.

More specifically, when definition information received from the server is a UI instruction, the image processing apparatus controls a display to display a screen in accordance with the received definition information, and acquires information from a user via an operation interface. Further, when definition information received from the server is an instruction to execute a functional operation, the image processing apparatus performs the functional operation in accordance with designated options.

SUMMARY

In the known service cooperation system, when the coordinated operation includes a plurality of pieces of definition information containing one or more UI instructions, there is a problem that a user needs to perform troublesome user operations responsive to the one or more UI instructions. In addition, there may be a user who wishes to cause the image processing apparatus to execute a typical coordinated operation by always inputting the same information responsive to one or more UI instructions.

Aspects of the present disclosure are advantageous to provide one or more improved techniques to attain a communication system that makes it possible to omit execution of previously-designated unit operations for each individual user, and achieve a coordinated operation with less-troublesome (simpler) user operations.

According to aspects of the present disclosure, a communication system is provided, which includes a mobile terminal device, a server on an Internet, and an image processing apparatus. The image processing apparatus includes an image processor, a first network interface, an operation interface, and a first controller configured to execute a coordinated operation by sequentially performing a plurality of unit operations included in the coordinated operation, the plurality of unit operations being respectively defined by a plurality of pieces of operation definition information sequentially received from the server, the first controller being further configured to execute the coordinated operation by receiving N-th operation definition information of the plurality of pieces of operation definition information from the server via the first network interface, N being a variable natural number equal to or more than one, the N-th operation definition information being for defining an N-th unit operation included in the coordinated operation, determining which one of an option selecting instruction and an operation instruction is included in the received N-th operation definition information, in response to determining that the N-th operation definition information includes the option selecting instruction to select one of options selectable in the coordinated operation, setting the operation interface into an acceptable state where the operation interface is allowed to accept an option selecting operation to select one of the selectable options, in response to accepting the option selecting operation via the operation interface, transmitting next-operation request information to the server via the first network interface, the next-operation request information being for requesting the server to transmit (N+1)th operation definition information that defines an (N+1)th unit operation following the N-th unit operation in the coordinated operation, and in response to determining that the N-th operation definition information includes the operation instruction that instructs the image processor to perform image processing, controlling the image processor to perform image processing as instructed by the operation instruction, in accordance with the selected option, set the first network interface into a receivable state where the first network interface is allowed to receive shortcut information from the mobile terminal device, the shortcut information indicating that the coordinated operation is started from an M-th unit operation of the plurality of unit operations, the M-th unit operation being defined by M-th operation definition information, M being a specific natural number equal to or more than two, and in response to receiving the shortcut information from the mobile terminal device via the first network interface, transmit the received shortcut information to the server via the first network interface. The server includes a second network interface configured to communicate with an external device via the Internet, and a second controller configured to receive the shortcut information from the image processing apparatus via the second network interface, in response to receiving the shortcut information, transmit the M-th operation definition information to the image processing apparatus via the second network interface, receive the next-operation request information from the image processing apparatus via the second network interface, and in response to receiving the next-operation request information, transmit the (N+1)th operation definition information to the image processing apparatus via the second network interface. The mobile terminal device includes a user interface, a storage configured to store the shortcut information, a third network interface, and a third controller configured to accept, via the user interface, a first shortcut selecting operation to select the shortcut information stored in the storage, and transmit the shortcut information selected by the first shortcut selecting operation, to the image processing apparatus via the third network interface.

According to aspects of the present disclosure, further provided is an image processing apparatus including an image processor, a communication interface configured to communicate with an external device via an Internet, a near-field communication interface configured to perform near-field wireless communication with an external device, using a near-field wireless communication protocol, an operation interface, and a controller configured to execute a coordinated operation by sequentially performing a plurality of unit operations included in the coordinated operation, the plurality of unit operations being respectively defined by a plurality of pieces of operation definition information sequentially received from a server, the controller being further configured to execute the coordinated operation by receiving N-th operation definition information of the plurality of pieces of operation definition information from the server via the communication interface, N being a variable natural number equal to or more than one, the N-th operation definition information being for defining an N-th unit operation included in the coordinated operation, determining which one of an option selecting instruction and an operation instruction is included in the received N-th operation definition information, in response to determining that the N-th operation definition information includes the option selecting instruction to select one of options selectable in the coordinated operation, setting the operation interface into an acceptable state where the operation interface is allowed to accept an option selecting operation to select one of the selectable options, in response to accepting the option selecting operation via the operation interface, transmitting next-operation request information to the server via the communication interface, the next-operation request information being for requesting the server to transmit (N+1)th operation definition information that defines an (N+1)th unit operation following the N-th unit operation in the coordinated operation, and in response to determining that the N-th operation definition information includes the operation instruction that instructs the image processor to perform image processing, controlling the image processor to perform image processing as instructed by the operation instruction, in accordance with the selected option, set the near-field communication interface into a receivable state where the near-field communication interface is allowed to receive shortcut information from a mobile terminal device, the shortcut information indicating that the coordinated operation is started from an M-th unit operation of the plurality of unit operations, the M-th unit operation being defined by M-th operation definition information, M being a specific natural number equal to or more than two, and in response to receiving the shortcut information from the mobile terminal device via the near-filed communication interface, transmit the received shortcut information to the server via the communication interface.

According to aspects of the present disclosure, further provided is a server including a storage configured to store a plurality of pieces of operation definition information, a communication interface configured to communicate with an external device via an Internet, and a controller configured to cause an image processing apparatus to execute a coordinated operation, by sequentially transmitting the plurality of pieces of operation definition information stored in the storage, the coordinated operation including a plurality of unit operations, the plurality of unit operations being respectively defined by the plurality of pieces of operation definition information, the controller being further configured to receive coordinated-operation request information from the image processing apparatus via the communication interface, in response to receiving the coordinated-operation request information, transmit acquisition instruction information to the image processing apparatus via the communication interface, the acquisition instruction information being for instructing the image processing apparatus to receive shortcut information via near-field wireless communication, the shortcut information indicating that the coordinated operation is started from an M-th unit operation of the plurality of unit operations, the M-th unit operation being defined by M-th operation definition information, M being a specific natural number equal to or more than two, receive the shortcut information from the image processing apparatus via the communication interface, and in response to receiving the shortcut information, transmit the M-th operation definition information to the image processing apparatus via the communication interface.

According to aspects of the present disclosure, further provided is a mobile terminal device configured to cause an image processing apparatus to execute a coordinated operation, the coordinated operation including a plurality of unit operations that are defined by a plurality of pieces of operation definition information, respectively. The mobile terminal device includes a user interface, a storage configured to store shortcut information, the shortcut information indicating that the coordinated operation is started from an M-th unit operation of the plurality of unit operations, the M-th unit operation being defined by M-th operation definition information, M being a specific natural number equal to or more than two, the shortcut information including identification information that identifies the M-th operation definition information, and option information indicating one or more particular options, the one or more particular options including one or more options that are selectable in each unit operation of first to (M−1)th unit operations and are to be used in each unit operation of the M-th and following unit operations, a near-field communication interface configured to communicate with an external device, using a near-field wireless communication protocol, and a controller configured to accept, via the user interface, a shortcut selecting operation to select the shortcut information stored in the storage, determine whether the shortcut information selected by the accepted shortcut selecting operation contains all of the option information necessary for the selected shortcut information, in response to determining that the shortcut information selected by the first shortcut selecting operation does not contain all of the option information necessary for the selected shortcut information, acquire necessary option information that is not contained in the shortcut information, and transmit the shortcut information containing the identification information and all of the necessary option information, to the image processing apparatus via the near-field communication interface.

BRIEF DESCRIPTION OF THE ACCOMPANYING DRAWINGS

FIG. 1 schematically shows a configuration of a communication system including a multi-function peripheral (hereinafter referred to as an "MFP"), a mobile terminal device, and a server, in an illustrative embodiment according to one or more aspects of the present disclosure.

FIG. 3 exemplifies shortcut information stored in a data storage area of the mobile terminal device in the illustrative embodiment according to one or more aspects of the present disclosure.

Figures 4A, 4B:
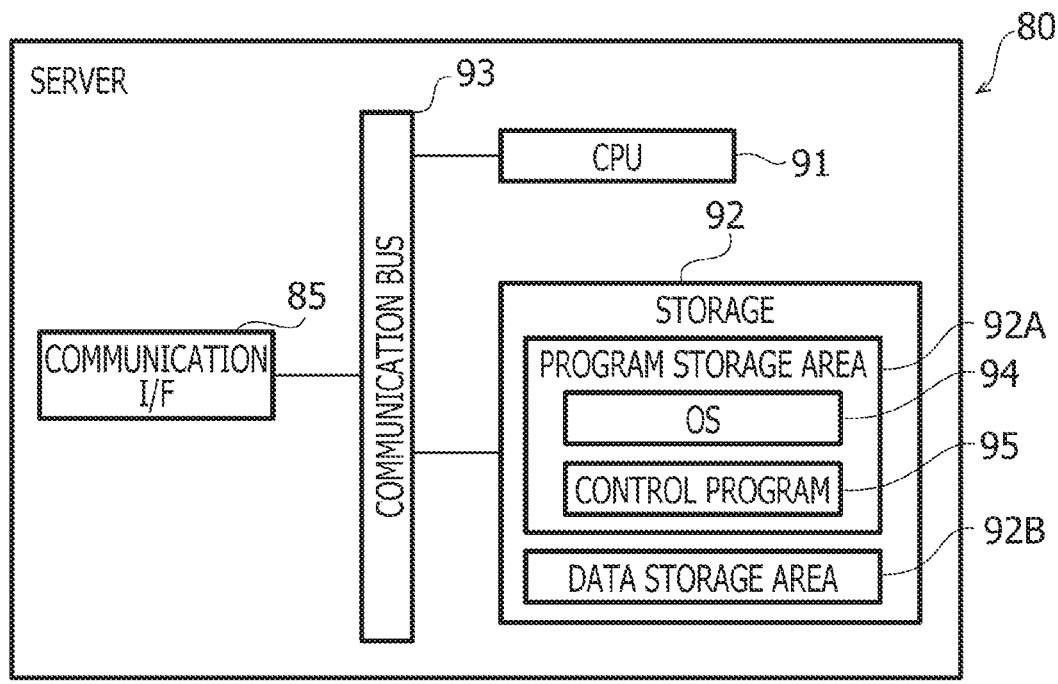

FIG. 4A is a functional block diagram of the server in the illustrative embodiment according to one or more aspects of the present disclosure.

FIG. 4B exemplifies a list of operation definition template files stored in a data storage area of the server in the illustrative embodiment according to one or more aspects of the present disclosure.

FIGS. 5A, 5B, 6, and 7 exemplify operation definition files in the illustrative embodiment according to one or more aspects of the present disclosure.

Figure 8:
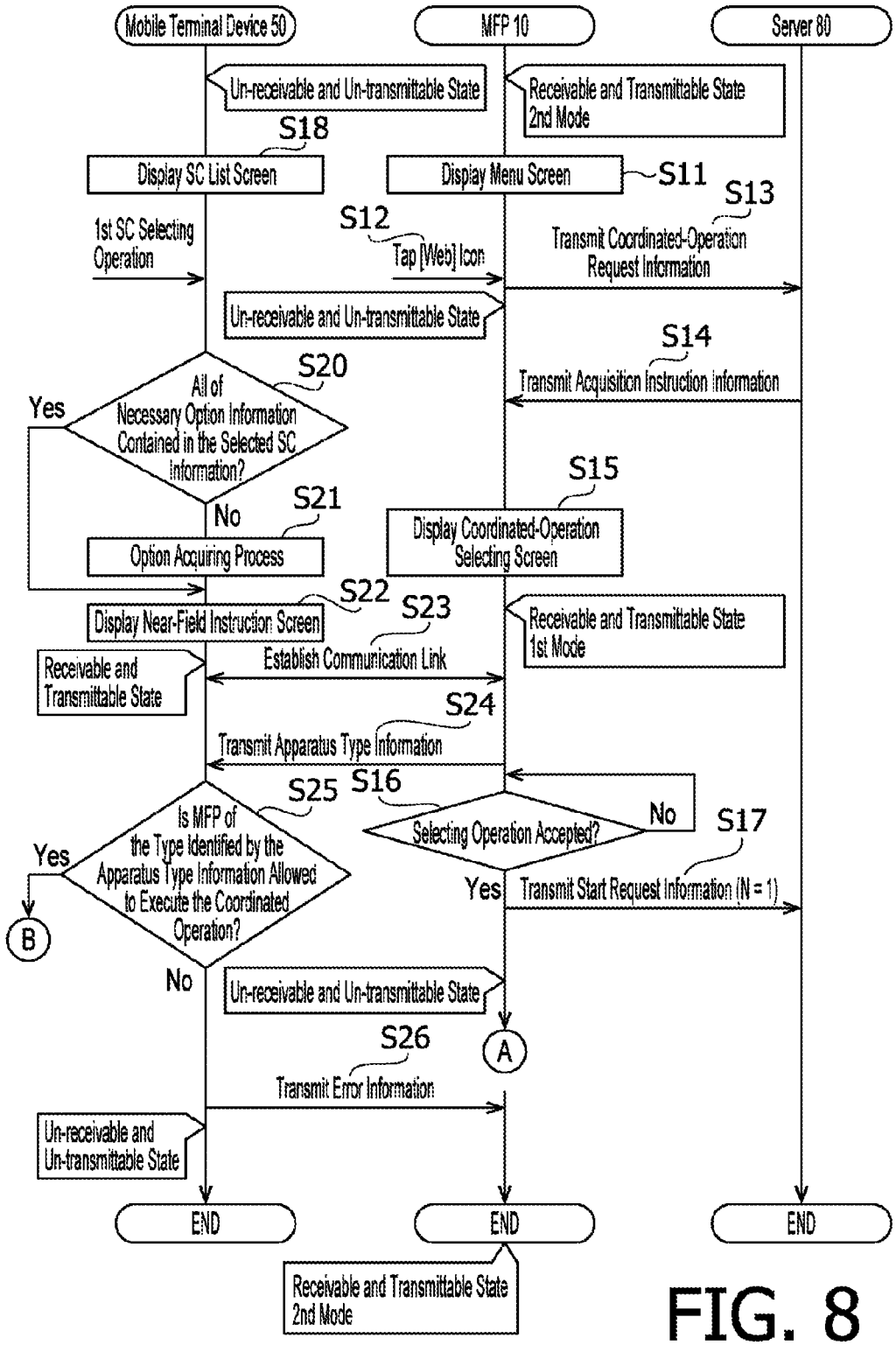
Figure 9:
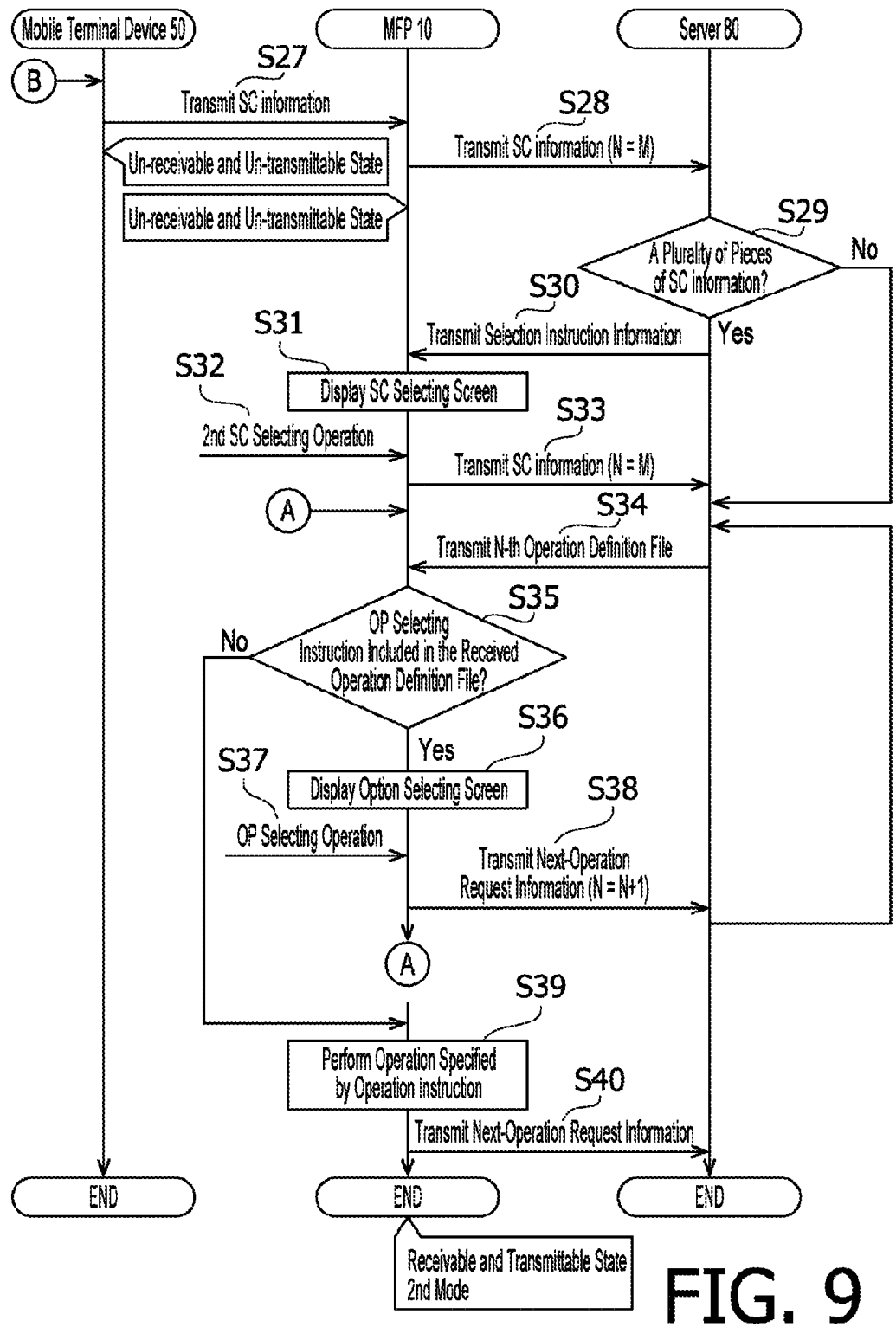

FIGS. 8 and 9 are flowcharts showing operations and processes to be performed in the communication system in the illustrative embodiment according to one or more aspects of the present disclosure.

Figure 10A:
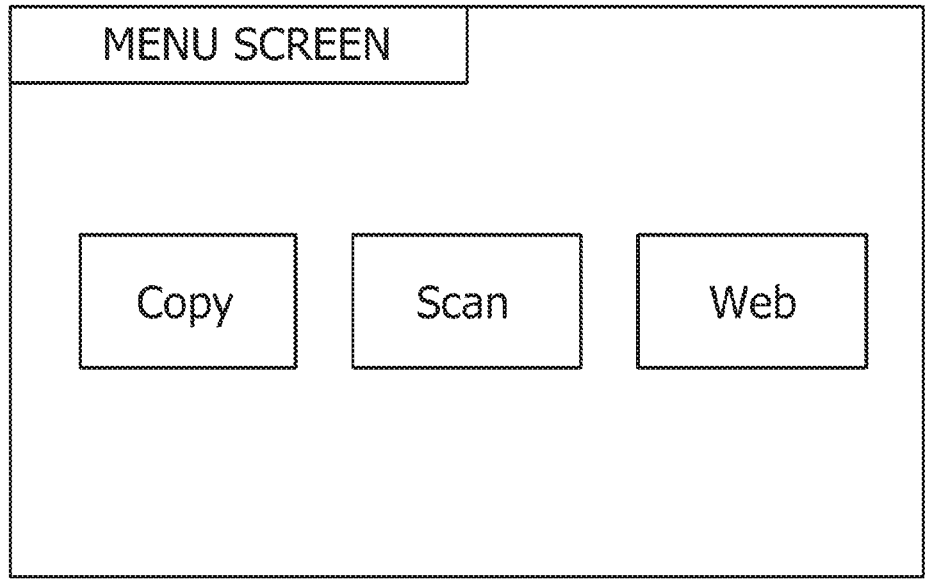

FIG. 10A exemplifies a menu screen to be displayed on a display of the MFP in the illustrative embodiment according to one or more aspects of the present disclosure.

Figure 10B:
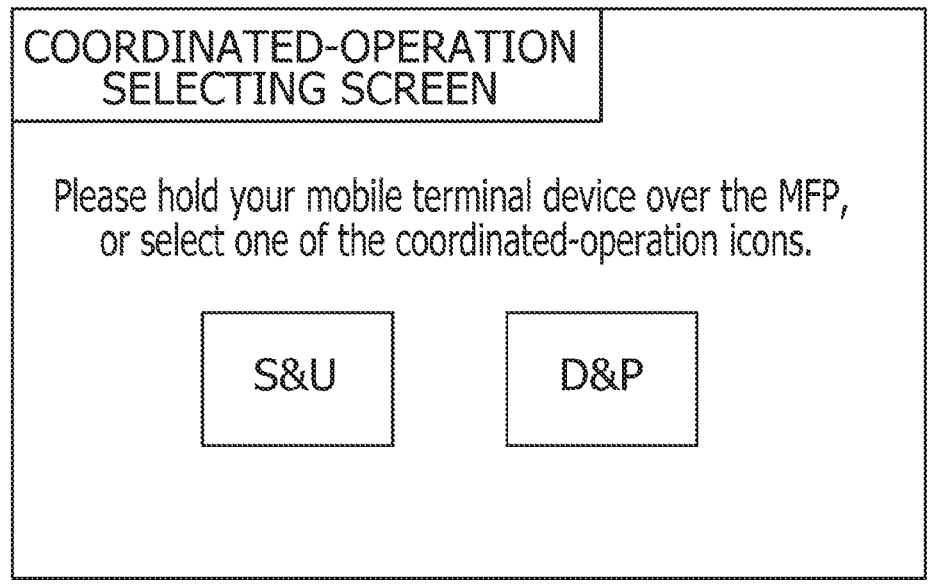

FIG. 10B exemplifies a coordinated-operation selecting screen to be displayed on the display of the MFP in the illustrative embodiment according to one or more aspects of the present disclosure.

Figure 11A:
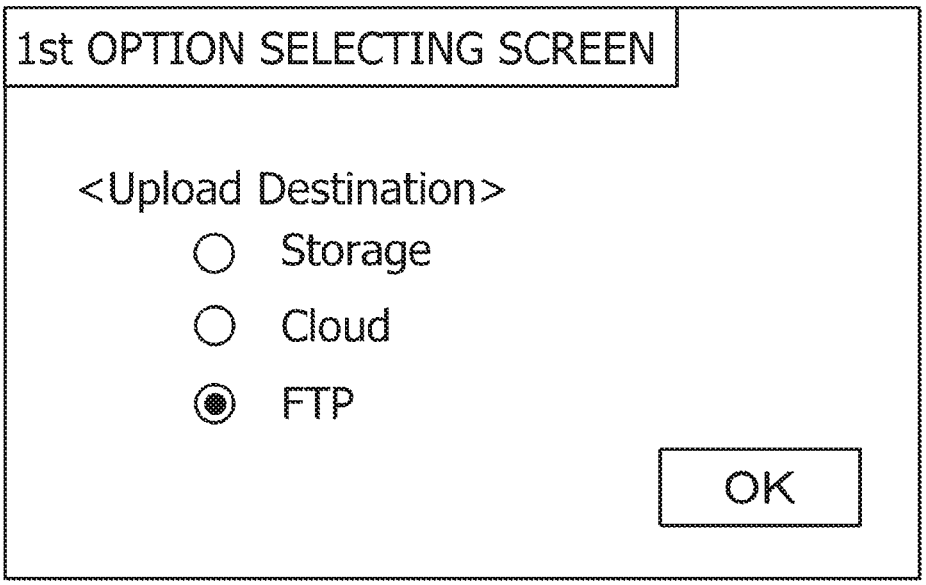

FIG. 11A exemplifies a first option selecting screen to be displayed on the display of the MFP in the illustrative embodiment according to one or more aspects of the present disclosure.

Figure 11B:
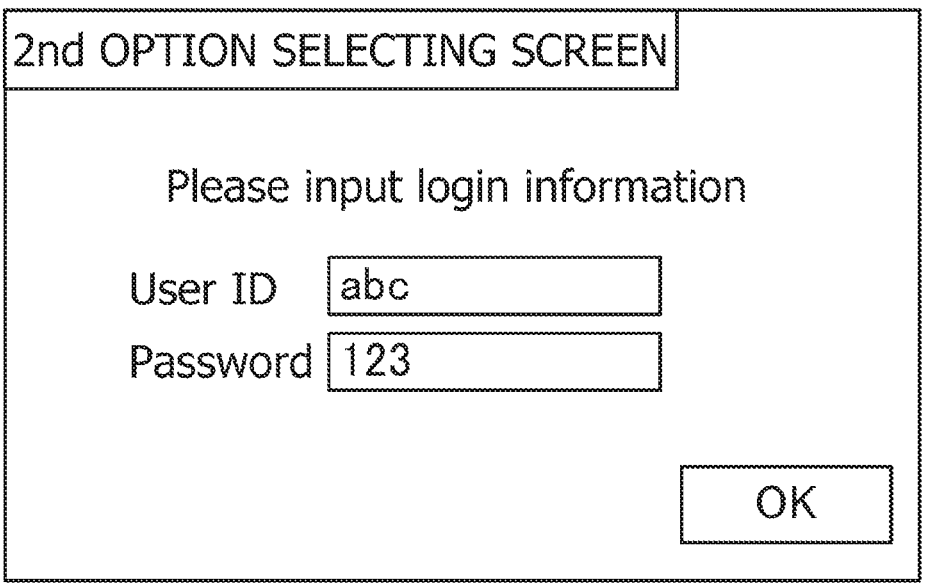

FIG. 11B exemplifies a second option selecting screen to be displayed on the display of the MFP in the illustrative embodiment according to one or more aspects of the present disclosure.

Figure 12A:
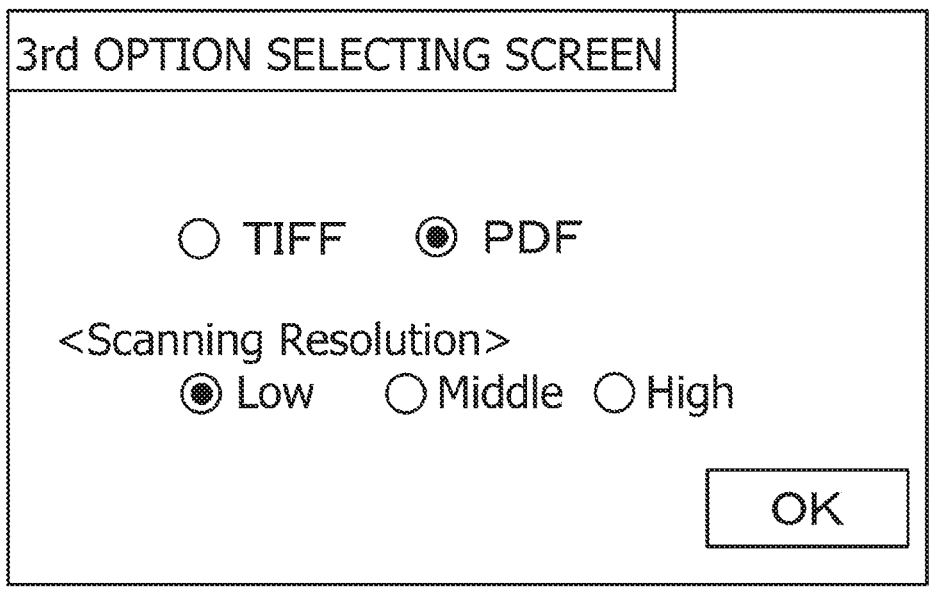

FIG. 12A exemplifies a third option selecting screen to be displayed on the display of the MFP in the illustrative embodiment according to one or more aspects of the present disclosure.

Figure 12B:
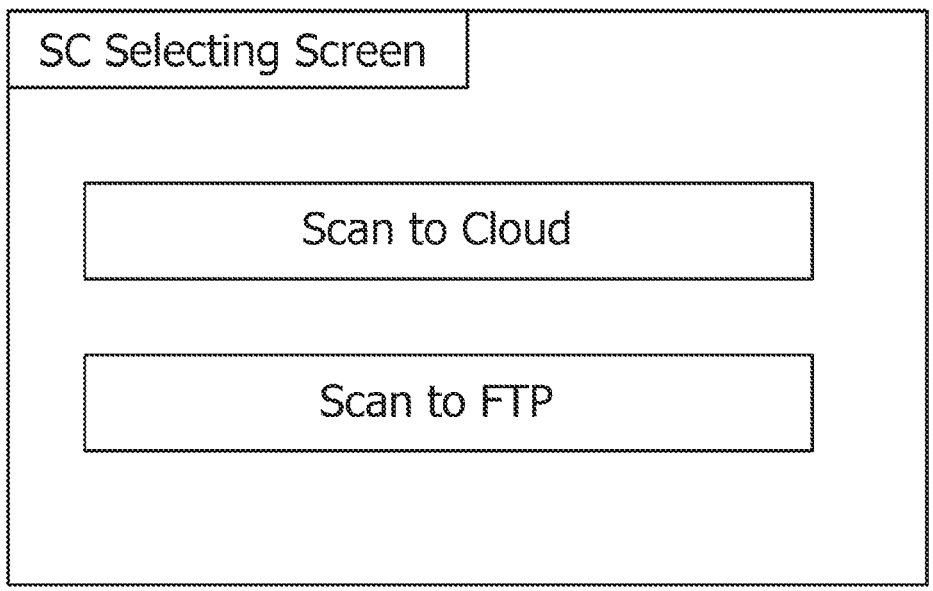

FIG. 12B exemplifies an SC selecting screen to be displayed on the display of the MFP in the illustrative embodiment according to one or more aspects of the present disclosure.

Figure 13A:
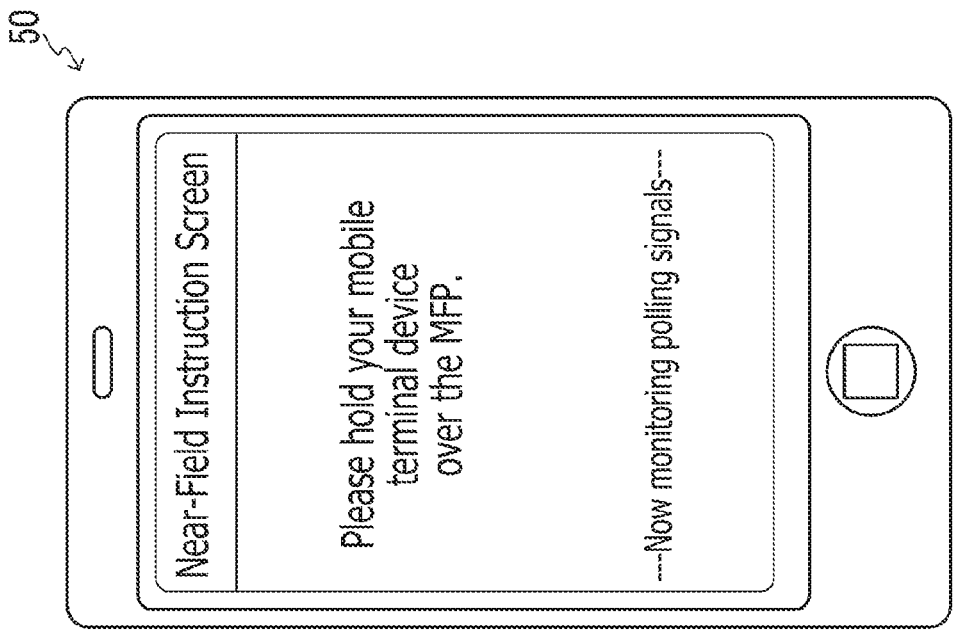

FIG. 13A exemplifies an SC list screen to be displayed on a display of the mobile terminal device in the illustrative embodiment according to one or more aspects of the present disclosure.

Figure 13B:
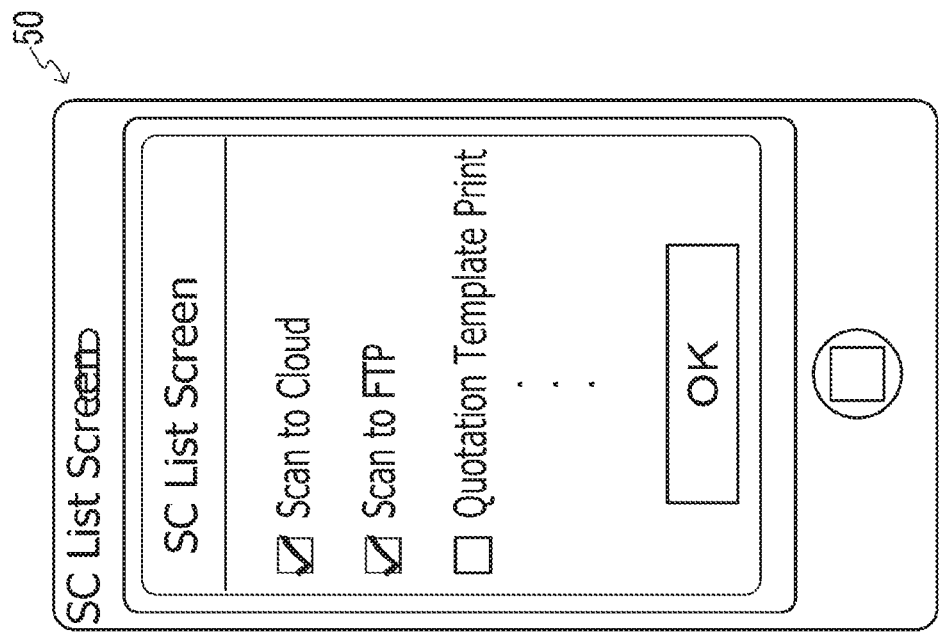

FIG. 13B exemplifies a near-field instruction screen to be displayed on the display of the mobile terminal device in the illustrative embodiment according to one or more aspects of the present disclosure.

Figure 14:
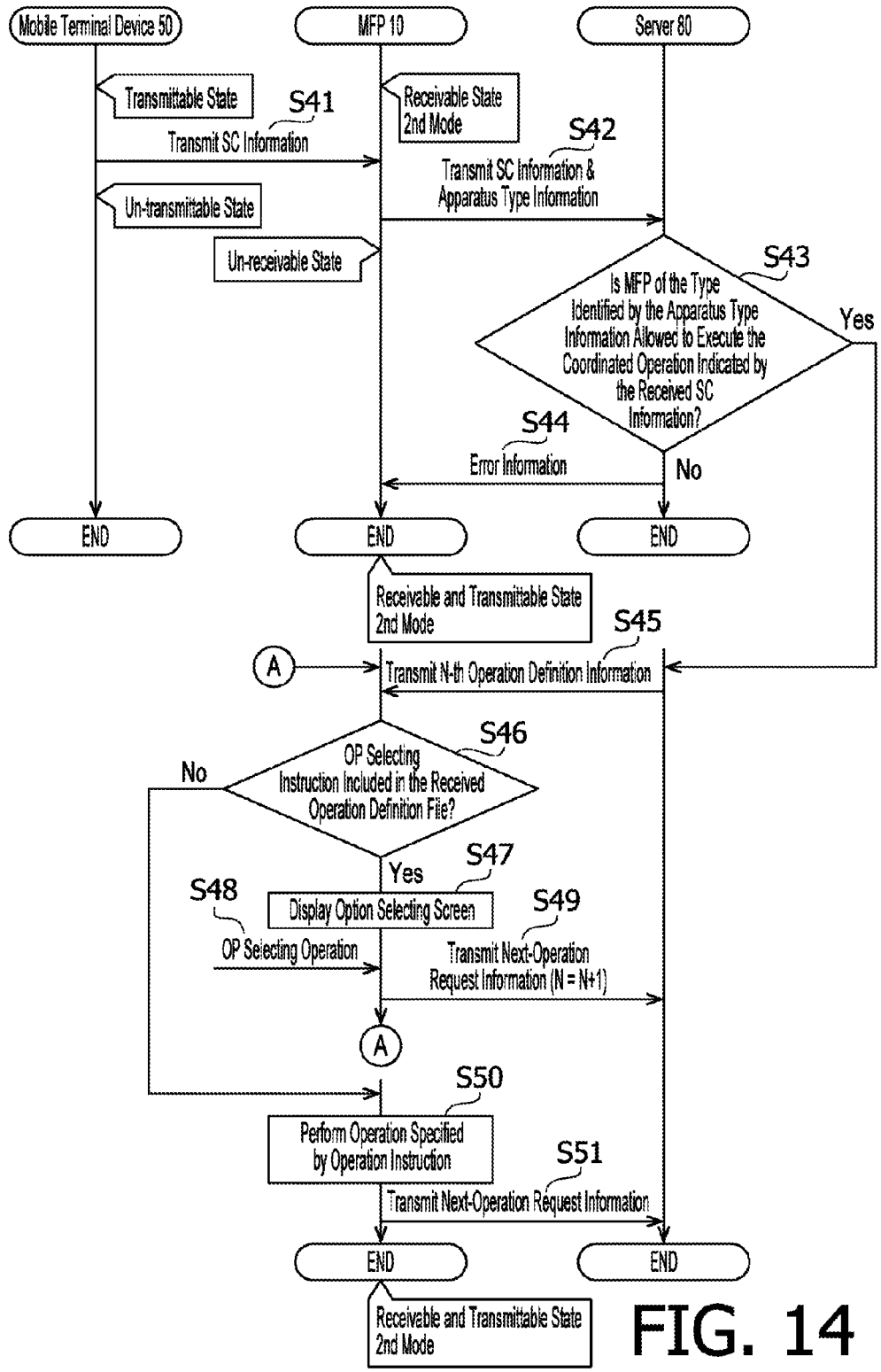

FIG. 14 is a flowchart showing operations and processes to be performed in a communication system in a modification according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1:
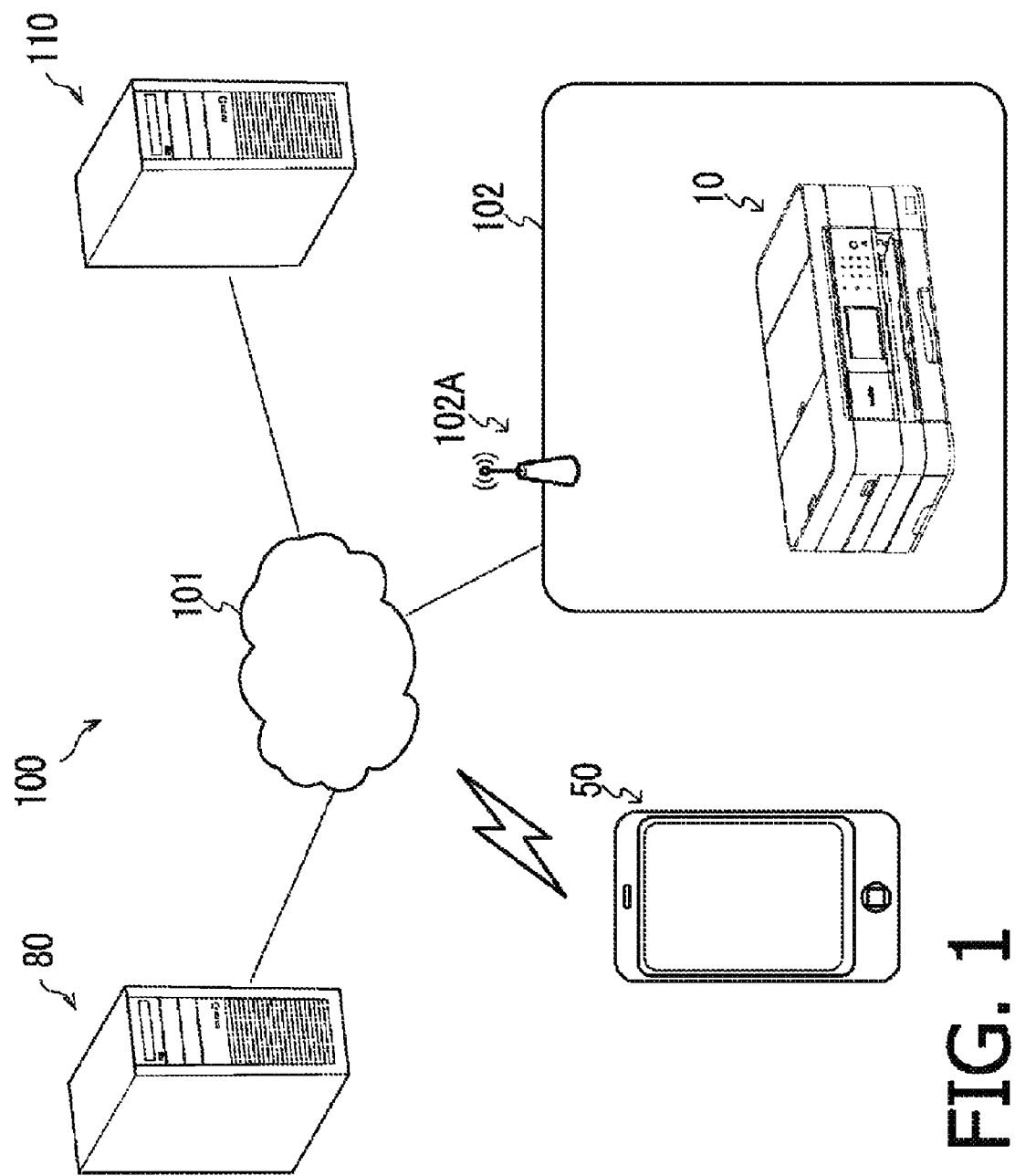

FIG. 1 schematically shows a communication system 100 in the illustrative embodiment. As shown in FIG. 1, the communication system 100 includes a multi-function peripheral (hereinafter referred to as an "MFP") 10, a mobile terminal device 50, and a server 80. The communication system 100 is configured to cause the MFP 10 to perform a coordinated operation. The coordinated operation includes a plurality of unit operations. The coordinated operation is achieved when the MFP 10 sequentially performs the plurality of unit operations in accordance with instructions from the server 80. As examples of the coordinated operation, various operations may be cited such as a scan-upload operation, a download-print operation, a file conversion operation, and an image enhancement operation.

The scan-upload operation is an operation of generating image data by an image scanner 12 and storing the generated image data into a service providing apparatus 110. The download-print operation is an operation of downloading image data stored in the service providing apparatus 110 and causing a printer 11 to record an image expressed by the downloaded image data on a recording sheet. The file conversion operation is an operation of causing the service providing apparatus 110 to convert a data format of image data generated by the image scanner 12. More specifically, the file conversion operation is an operation of converting the data format of the image data from an image format to another format without changing a substantial image expressed by the image data. The image enhancement operation is an operation of composing image data generated by the image scanner 12 with another piece of image data. An operation of composing image data generated by the image scanner 12 with template image data stored in the service providing apparatus 110 is an example of the image enhancement operation. Nonetheless, the coordinated operation is not limited to the aforementioned exemplary operations.

The communication system 100 is configured to communicate with the service providing apparatus 110. The MFP 10, the mobile terminal device 50, the server 80, and the service providing apparatus 110 are communicably interconnected via networks such as the Internet 101, a wired LAN, a wireless LAN 102, and a combination of the Internet 101, the wired LAN, and the wireless LAN 102. It is noted that "LAN" is an abbreviated form of "Local Area Network."

The MFP 10 belongs to the wireless LAN 102. The wireless LAN 102 is connected with the Internet 101 via a router (not shown). The mobile terminal device 50 is connected with the Internet 101 via a base station (not shown). The server 80 and the service providing apparatus 110 are connected with the Internet 101. It is noted that "the MFP 10 belonging to the wireless LAN 102" represents that the MFP 10 is set to belong to the wireless LAN 102 and communicable with other devices belonging to the wireless LAN 102. More specifically, the same SSID as an access point 102A of the wireless LAN 102 is set for the MFP 10. The same network address as assigned to the wireless LAN 102 is provided to the MFP 10.

The MFP 10 is configured to communicate with the server 80 and the service providing apparatus 110 via the Internet 101 from the access point 102A and the router (not shown). The mobile terminal device 50 is configured to perform wireless communication with the server 80 and the service providing apparatus 110 via the Internet 101 from the base station (not shown). The communication via the Internet 101 is an example of indirect communication with an external device via a communication device. Further, the MFP 10 and the mobile terminal device 50 are allowed to perform wireless communication therebetween without involving the Internet 101. The communication without involving the Internet 101 is an example of direct communication that is wireless communication with an external device without involving any communication device. The router (not shown) and the base station (not shown) are examples of communication devices.

It is noted that "wireless communication" is not limited to wireless communication throughout an entire range of communication section. Namely, "the MFP 10 performs wireless data communication via the access point 102A" represents that communication by the MFP 10 via the access point 102A includes at least wireless communication between the MFP 10 and the access point 102A. The same applies to the mobile terminal device 50.

[MFP]

Figure 2A:
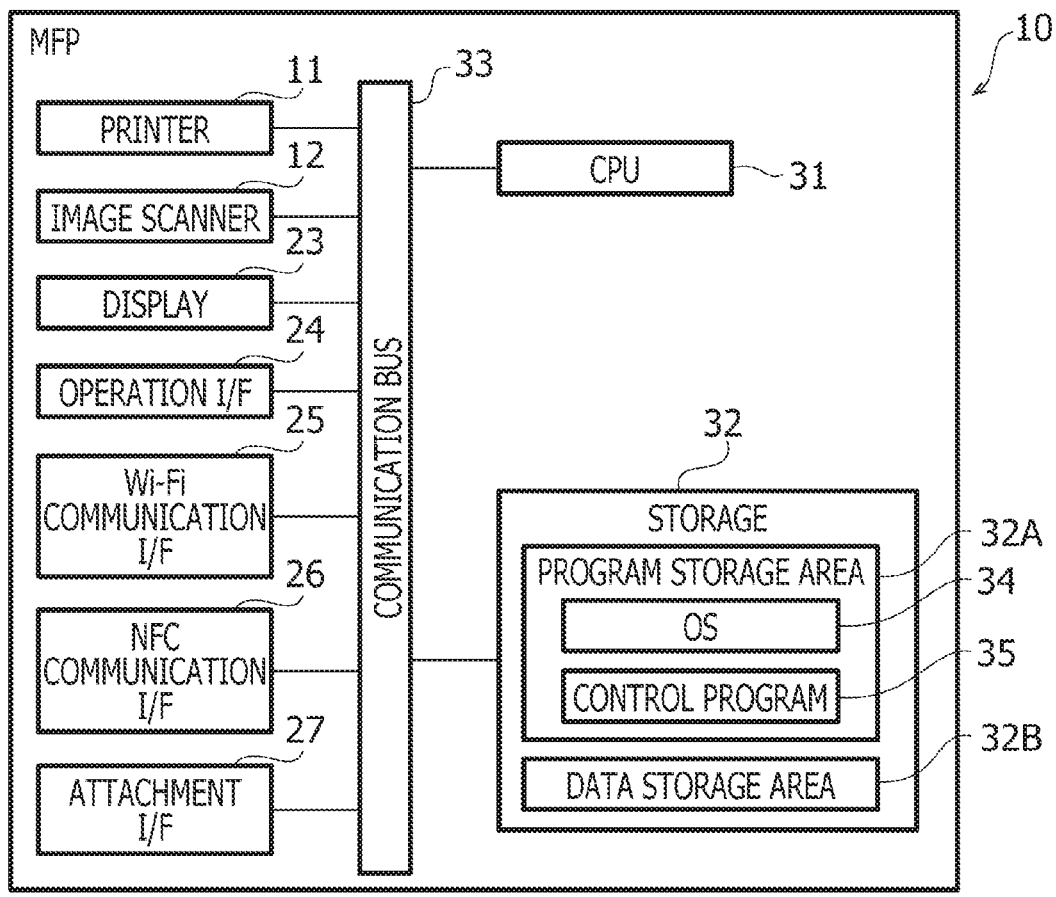
FIG. 2A is a functional block diagram of the MFP in the illustrative embodiment according to one or more aspects of the present disclosure.

As shown in FIG. 2A, the MFP 10 includes a printer 11, an image scanner 12, a display 23, an operation interface 24, a Wi-Fi (trademark registered by Wi-Fi Alliance) communication interface 25, an NFC (which is an abbreviated form of "Near Field Communication") communication interface 26, an attachment interface 27, a CPU 31, a storage 32, and a communication bus 33. Individual elements included in the MFP 10 are interconnected via the communication bus 33. The MFP 10 is an example of an image processing apparatus. The printer 11 and the image scanner 12 are examples of an image processor. The Wi-Fi communication interface 25 is an example of an apparatus-side communication interface and an example of a communication interface of the image processing apparatus. The NFC communication interface 26 is an example of an apparatus-side communication interface and an example of a near-field communication interface of the image processing apparatus.

[Printer and Image Scanner]

The printer 11 is configured to perform a recording process of recording an image expressed by image data on a recording sheet. As a recording method of the printer 11, known methods may be employed such as an inkjet method and an electrophotographic method. The image scanner 12 is configured to perform a scanning process of scanning an image recorded on a document sheet and generating image data. The MFP 10 may further have other functions such as a facsimile function to perform facsimile communication and a copy function to scan an image recorded on a document sheet and record the scanned image on a recording sheet.

[Display]

The display 23 has a display screen configured to display various kinds of information. As the display 23, various types of displays may be used such as an LCD (which is an abbreviated form of "Liquid Crystal Display") and an OELD (which is an abbreviated form of "Organic Electro-Luminescence Display").

[Operation Interface]

The operation interface 24 is configured to accept a user operation of selecting one of objects displayed on the display screen of the display 23. Specifically, the operation interface 24 has buttons, and is configured to, when a button is pressed, transmit to the CPU 31 an operation signal associated with the pressed button. The operation interface 24 may include a filmy touch sensor formed on the display screen of the display 23. Namely, the display 23 may be configured as a touch panel display.

It is noted that the "objects" represent images selectable by a user operation via the operation interface 24. For instance, the objects may be character strings displayed on the display 23. When a direction key of the operation interface 24 is pressed, one of the objects may be displayed in a highlighted manner. Then, when a determination button of the operation interface 24 is pressed, the highlighted object may be selected. Further, for example, when the operation interface 24 is a touch panel, the objects may include icons, buttons, and links displayed on the display 23. Then, an object displayed in a touched position on the operation interface 24 (i.e., the touch panel) may be selected.

The operation interface 24, which is configured as a touch panel, accepts a user operation of touching a position on the display screen of the display 23. Then, the operation interface 24 outputs position information that indicates the touched position on the display screen. For instance, the position information may be expressed as coordinates (x, y) on an x-y plane with an upper left end of the display screen as an origin, a rightward direction of the display screen as a positive direction of an x-axis, and a downward direction of the display screen as a positive direction of a y-axis. As the touch sensor, known types of touch sensors may be used such as an electrostatic capacitive touch sensor and a resistive film type touch sensor.

It is noted that, in the present disclosure, "touch" may include every operation of bringing an input medium in touch with a position on the display screen. Specifically, "touch" may include a tapping operation of separating the input medium touching the display screen away from the display screen in a particular period of time, a long touching operation of letting the input medium touching the display screen statically stay on the display screen, a sliding operation of sliding the input medium in touch with the display screen, a flick operation of sliding the input medium in touch with the display screen with a sliding acceleration equal to or more than a threshold value, a pinch-in operation of sliding two input media to become closer to each other from respective different positions on the display positions, and a pinch-out operation of sliding two input media to become farther away from each other from respective different positions on the display positions.

Furthermore, "touch" may include an operation of bringing the input medium in proximity to the display screen even though the input medium is not brought into contact with the display screen. The input medium may include a user's finger and a stylus pen.

[Wi-Fi Communication Interface]

The Wi-Fi communication interface 25 is an interface for performing wireless communication with external devices. Specifically, the Wi-Fi communication interface 25 is configured to perform indirect communication with the mobile terminal device 50, the server 80, and the service providing apparatus 110, and perform direct communication with the mobile terminal device 50. For instance, the Wi-Fi communication interface 25 performs communication in accordance with a protocol complying with IEEE 802.11 standards. In this case, the indirect communication indicates communication in an infrastructure mode. The direct communication indicates communication in an ad hoc mode or Wi-Fi direct communication.

[NFC Communication Interface]

The NFC communication interface 26 is an interface for performing wireless communication in accordance with a near-field protocol complying with NFC standards. Wireless communication with external devices via the NFC communication interface 26 is an example of the direct communication and an example of near-field wireless communication. The NFC communication interface 26 includes an IC chip incorporated therein. The IC chip has a memory configured to store information to be communicated with external devices. The NFC standards may be exemplified as standards for defining a near-field communication protocol.

Further, TransferJet (trademark registered by TransferJet Consortium) may be exemplified as standards for defining a near-field communication protocol.

In the present disclosure, devices configured to perform communication in accordance with a protocol complying with the NFC standards may be referred to as "NFC devices." In addition, communication according to a protocol complying with the NFC standards may be referred to as "NFC communication." Namely, the MFP 10 and the mobile terminal device 50 are examples of the NFC devices. The MFP 10 and the mobile terminal device 50 operate in one of modes such as a P2P (which is an abbreviated form of "Peer to Peer") mode, a Reader mode, a Writer mode, and a CE (which is an abbreviated form of "Card Emulation") mode. In the present disclosure, the Reader mode and the Writer mode may collectively be referred to as an "R/W mode."

The P2P mode is a mode for performing bidirectional communication between two NFC devices. NFC devices of "Type A" defined in ISO/IEC 1443 determined by NFC Forum are allowed to operate in the P2P mode. Further, NFC devices of "Type F" defined in ISO/IEC 18092 determined by NFC Forum are allowed to operate in the P2P mode. Meanwhile, NFC devices of "Type B" defined in ISO/IEC 1443 determined by NFC Forum are not allowed to operate in the P2P mode.

The R/W mode and the CE mode are modes for performing unidirectional communication between two NFC devices. The CE mode is a mode for an NFC device to operate as a "Card" that is a format defined by the NFC Forum. NFC devices in Type A, Type F, and Type B are allowed to operate in the CE mode. The Reader mode is a mode for reading information out of an NFC device operating in the CE mode. The Writer mode is a mode for writing information into an NFC device operating in the CE mode.

In the illustrative embodiment, a main explanation will be provided of an example where the MFP 10 operates in the R/W mode, and the mobile terminal device 50 operates in the CE mode. In this example, namely, the MFP 10 that operates in the R/W mode is allowed to read information out of the mobile terminal device 50 that operates in the CE mode and write information into the mobile terminal device 50. Nonetheless, the present disclosure is not limited to the example. For instance, the MFP 10 may operate in the CE mode, and the mobile terminal device 50 may operate in the R/W mode. Both the MFP 10 and the mobile terminal device 50 may operate in the P2P mode.

In the illustrative embodiment, the NFC communication interface 26 of the MFP 10 performs a "Poll" operation. The Poll operation is an operation of repeatedly outputting a polling signal at intervals of a predetermined period of time and monitoring a response signal to the polling signal. On the other hand, in the illustrative embodiment, the NFC communication interface 56 of the mobile terminal device 50 performs a "Listen" operation. The "Listen" operation is an operation of monitoring a polling signal and outputting a response signal in response to receipt of the polling signal.

In response to the mobile terminal device 50 being brought close to the MFP 10, the NFC communication interface 56 of the mobile terminal device 50 receives a polling signal from the NFC communication interface 26 of the MFP 10. Then, when the NFC communication interface 26 of the MFP 10 receives a response signal from the NFC communication interface 56 of the mobile terminal device 50, an NFC communication link (hereinafter referred to as an "NFC link") is established between the MFP 10 and the mobile terminal device 50 in accordance with a predetermined procedure complying with the NFC standards. After that, the MFP 10 and the mobile terminal device 50 perform data communication with each other via the NFC link.

Nonetheless, the relationship between the MFP 10 and the mobile terminal device 50 is not limited to the aforementioned example. For instance, the NFC communication interface 26 of the MFP 10 may perform a "Listen" operation, and the NFC communication interface 56 of the mobile terminal device 50 may perform the Poll operation. In this case, in response to the mobile terminal device 50 being brought close to the MFP 10, the NFC communication interface 26 of the MFP 10 receives a polling signal from the NFC communication interface 56 of the mobile terminal device 50. Then, when the NFC communication interface 56 of the mobile terminal device 50 receives a response signal from the NFC communication interface 26 of the MFP 10, an NFC link may be established between the MFP 10 and the mobile terminal device 50.

[Attachment Interface]

The attachment interface 27 is an interface configured such that a portable storage medium (hereinafter, which may be referred to as a "storage") is detachably attached thereto. The CPU 31 is allowed to read data or information out of the portable storage medium attached to the attachment interface 27, and write data or information into the portable storage medium attached to the attachment interface 27. As examples of the portable storage medium, various kinds of storage media may be cited such as a USB memory, an SD card, a CD-ROM, and a DVD-ROM.

[CPU]

The CPU (which is an abbreviated form of "Central Processing Unit") 31 is configured to take overall control of the MFP 10. The CPU 31 acquires below-mentioned various programs from the storage 32 and executes the acquired programs, based on various kinds of information output from the operation interface 24 and various kinds of information acquired from external devices via the Wi-Fi communication interface 25 and/or the NFC communication interface 26. Namely, the CPU 31 and the storage 32 form an example of a first controller and an example of a controller of the image processing apparatus.

[Storage]

The storage 32 has a program storage area 32A and a data storage area 32B. The program storage area 32A stores therein an OS (which is an abbreviated form of "Operating System") 34 and a control program 35. The OS 34 and the control program 35 are programs build in a binary format. The control program 35 may be a single program, or may be an integration or collection of a plurality of programs. The data storage area 32B stores therein data and/or information necessary for execution of the control program 35. The storage 32 is an example of a memory of the image processing apparatus.

It is noted that, in the present disclosure, "data" and "information" are similar to each other in that each of "data" and "information" is a computer-treatable bit or a computer-treatable bit string. The "data" is such one or more bits that a computer is allowed to treat them without considering what is denoted by each bit contained therein. Meanwhile, the "information" is such one or more bits that a process by a computer diverges depending on what is denoted by each bit contained therein. Further, an "instruction" is one or more control signals that prompt a transmission destination device to perform a next operation. The "instruction" may contain information, or the "instruction" itself may have a property as information.

Further, regarding "data" and "information," even though a format (e.g., a text format, a binary format, and a flag format) thereof is changed for each of a plurality of computers, as far as they are recognized as having substantially the same contents among the plurality of computers, they may be treated as the same data and information. For instance, a situation may be possible, in which information representing "two" is held as text-format information such as "0x32" in ASCII code in a computer, and is held as binary-format information such as "10" in binary notation in another computer.

Nonetheless, the aforementioned discrimination between "data" and "information" is not so strict, and exceptional treatment thereof may be acceptable. For instance, "data" may be temporarily treated as "information," and "information" may be temporarily treated as "data." Further, what is treated as "data" in a device may be treated as "information" in another device. Moreover, "information" may be taken out of "data," and "data" may be taken out of "information."

The storage 32 may be, for instance, one of or a combination of at least two of a RAM, a ROM, an EEPROM, an HDD, and a buffer of the CPU 31. It is noted that RAM is an abbreviated form of "Random Access Memory," ROM is an abbreviated form of "Read-Only Memory," EEPROM is an abbreviated form of "Electrically Erasable Programmable Read-Only Memory," and HDD is an abbreviated form of "Hard Disk Drive."

The storage 32 may be a non-transitory computer-readable storage medium. The non-transitory computer-readable medium may include recording medium such as a CD-ROM and a DVD-ROM as well as the RAM, the ROM, the EEPROM, the HDD, and the buffer of the CPU 31. The non-transitory computer-readable medium may be a tangible medium. It is noted that the non-transitory computer-readable medium does not include any electric signal such as a carrier wave for carrying a program downloaded from a server on the Internet.

The programs stored in the program storage area 32A are executed by the CPU 31. Nonetheless, in the present disclosure, operations to be implemented by execution of the programs may be described with omission of the CPU 31. Namely, in the following description, a description "a program A performs a process A" may represent "the CPU 31 executing the program A performs the process A."

The OS 34 is a basic program that provides an API (which is an abbreviated form of "Application Programming Interface") for controlling hardware elements included in the MFP 10 such as the printer 11, the image scanner 12, the display 23, the operation interface 24, the Wi-Fi communication interface 25, the NFC communication interface 26, and the attachment interface 27. Namely, each of the aforementioned programs controls a corresponding hardware element by invoking the API provided by the OS 34. Nonetheless, in the present disclosure, operations to be implemented by execution of the programs may be described with omission of the OS 34. Namely, in the following description, a description "a program B controls a hardware element C" may represent "the program B controls the hardware element C via the API provided by the OS 34."

[Mobile Terminal Device]

Figure 2B:
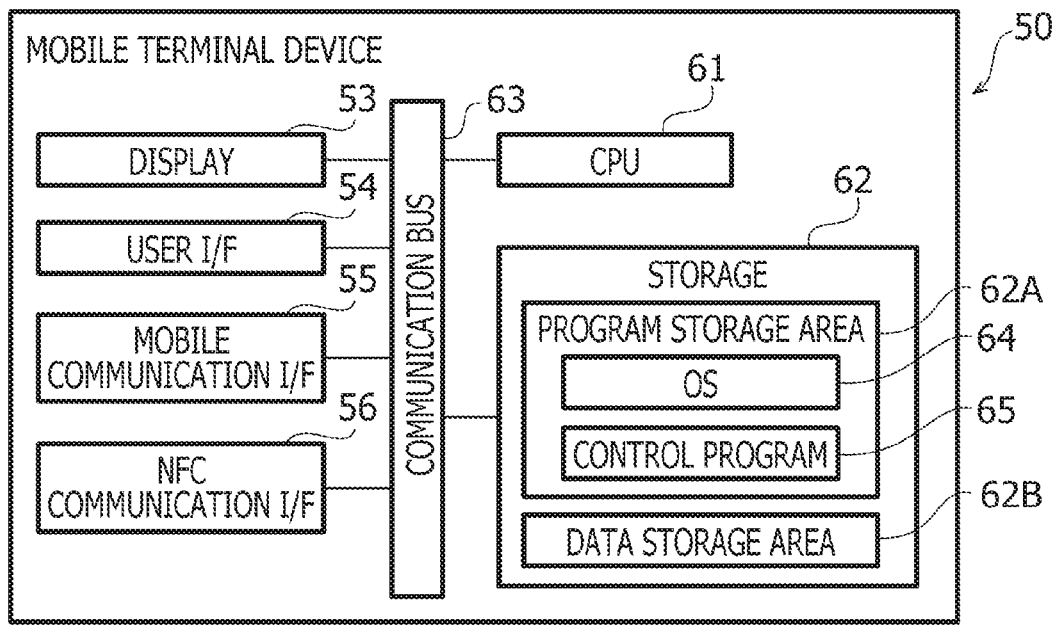
FIG. 2B is a functional block diagram of the mobile terminal device in the illustrative embodiment according to one or more aspects of the present disclosure.

As shown in FIG. 2B, the mobile terminal device 50 includes a display 53, a user interface 54, a mobile communication interface 55, an NFC communication interface 56, a CPU 61, a storage 62, and a communication bus 63. The mobile terminal device 50 is an example of a mobile terminal device. The mobile communication interface 55 is an example of a terminal-side communication interface and an example of a communication interface of the mobile terminal device. The NFC communication interface 56 is an example of a terminal-side near-field communication interface and an example of a near-field communication interface of the mobile terminal device. The CPU 61 and the storage 62 form an example of a third controller and an example of a controller of the mobile terminal device. The storage 62 is an example of a storage of the mobile terminal device. Elements included in the mobile terminal device 50 such as the display 53, the user interface 54, the NFC communication interface 56, the CPU 61, the storage 62, and the communication bus 63 may have substantially the same configurations (functions) as elements included in the MFP 10 such as the display 23, the operation interface 24, the NFC communication interface 26, the CPU 31, the storage 32, and the communication bus 33, respectively. Therefore, redundant explanations of the elements included in the mobile terminal device 50 will be omitted.

The mobile communication interface 55 is an interface configured to connect with a mobile communication network (not shown) provided by a communication provider. The mobile communication network (not shown) is connected with the Internet 101. For instance, the mobile communication interface 55 performs wireless communication in accordance with communication standards such as W-CDMA, CDMA2000, or LTE. It is noted that W-CDMA is an abbreviated form of "Wideband Code Division Multiple Access," and LTE is an abbreviated form of "Long Term Evolution." Further, it is noted that the mobile terminal device 50 may include a Wi-Fi communication interface, in addition to or instead of the mobile communication interface 55. In this case, the Wi-Fi communication interface of the mobile terminal device 50 may have substantially the same functions as the Wi-Fi communication interface 25 of the MFP 10.

As shown in FIG. 3, for instance, the data storage area 62B stores shortcut (which may be hereinafter referred to as "SC") information. The shortcut information represents that a coordinated operation is to be started from an M-th unit operation (M: a specific natural number equal to or more than two). For instance, the shortcut information may include a shortcut ID, a shortcut name, and option (which may be hereinafter referred to as "OP") information. The shortcut information may be stored into the data storage area 62B, along with installation of the control program 65 thereinto. Alternatively, the shortcut information may be downloaded from a server (not shown) after the installation of the control program 65, or may be generated by a user operation.

The shortcut ID is formed with a combination of a coordinated operation ID that identifies the coordinated operation and a unit operation ID that indicates from which unit operation numbered from the first unit operation the coordinated operation is to be started. The shortcut ID is an example of second identification information that identifies operation definition information. The unit operation ID is an example of identification information that identifies M-th operation definition information. In the example shown in FIG. 3, a shortcut ID "001-2" indicates that a scan-upload operation identified by a coordinated operation ID "001" will be started from a second unit operation. In addition, a shortcut ID "001-3" indicates that the scan-upload operation identified by the coordinated operation ID "001" will be started from a third unit operation. Further, a shortcut ID "002-3" indicates that a download-print operation identified by a coordinated operation ID "002" will be started from a third unit operation.

The shortcut name is a name of shortcut information to be displayed on a below-mentioned SC list screen and a below-mentioned SC selecting screen. The shortcut name may be previously determined or may be assigned by the user. The option information indicates one or more particular options that include one or more options selectable in each unit operation of the first to (M−1)th unit operations and used in each unit operation of the M-th and following unit operations. For instance, the option information may be acquired from the user via the user interface 54. In the example shown in FIG. 3, for the shortcut information of the shortcut ID "001-3," an upload destination option "FTP" is already set, and any token option is not set.

[Server]

As shown in FIG. 4A, the server 80 includes a communication interface 85, a CPU 91, a storage 92, and a communication bus 93. The server 80 is an example of a server. The CPU 91 and the storage 92 form an example of a second controller and an example of a controller of the server. The storage 92 is an example of a storage device and an example of a storage of the server. Elements included in the server 80 such as the communication interface 85, the CPU 91, the storage 92, and the communication bus 93 may have substantially the same configurations (functions) as elements included in the MFP 10 such as the Wi-Fi communication interface 25, the CPU 31, the storage 32, and the communication bus 33, respectively. Therefore, redundant explanations of the elements included in the server 80 will be omitted.

As shown in FIG. 4B, for instance, the data storage area 92B stores therein a plurality of operation definition template files. For example, six operation definition template files shown in FIG. 4B form a group of template files associated with the scan-upload operation. A group of template files associated with the download-print operation or the file conversion operation is not shown in the illustrative embodiment. The control program 95 generates operation definition files using the operation definition template files.

An operation definition file is an example of operation definition information that defines one of the plurality of unit operations included in the coordinated operation. In the operation definition file, for instance, a content of a screen to be displayed on the display 23 of the MFP 10, contents of icons to be displayed on the screen, and URLs associated with the icons may be written in XML (which is an abbreviated form of "Extensible Markup Language"). Information between XML tags contained in the operation definition file is an example of below-mentioned content information. The operation definition file may be written in HTML (which is an abbreviated form of "HyperText Markup Language") instead of XML.

The operation definition file may include various tags that indicates options selectable in the coordinated operation and an option selecting instruction. The option selecting instruction indicates how to select an option. As options selectable in the scan-upload operation, for instance, format options (e.g., "TIFF," and "PDF"), resolution options (e.g., "High," "Middle," and "Low"), and upload destination options (e.g., "Storage," "Cloud," and "FTP") may be cited. As options selectable in the download-print operation, for instance, size options (e.g., "A4," "B4," and "L-type"), and layout options (e.g., "2in1," and "Double-Side") may be cited. As options selectable in the file conversion operation, for instance, conversion options (e.g., "doc," "PDF," and "Bmp") representing a format after conversion may be cited.

The operation definition file, which includes the option selecting instruction, includes component tags, a selection completion tag, and a reply destination URL tag corresponding to the selection completion tag. A component tag is a tag indicating a component (e.g., a radio button, a checkbox, and a text box) to be displayed on the display 23 so as to accept a user input. An <Option> tag indicating a radio button to be displayed, a <Text> tag indicating a text box to be displayed, and a <SelectionCompletion> tag indicating an [OK] icon to be displayed are examples of the option selecting instruction. The [OK] icon is an icon for accepting an instruction representing completion of selection of options. In the reply destination URL tag corresponding to the selection completion tag, a URL of the server 80 that the MFP 10 is required to access is written.

In the aforementioned example, the format options, the resolution options, the size options, and the layout options are examples of execution parameters for the image processor (e.g., the printer 11 and the image scanner 12) that performs an operation in accordance with a below-mentioned operation instruction. Further, the conversion options are examples of execution parameters for the service providing apparatus 110 that converts data format. Moreover, as selectable options in the coordinated operation that needs data communication with the service providing apparatus 110, for example, user ID options and password options for logging in to the service providing apparatus 110, and token options may be cited. The token is an example of authentication information representing authority to perform data communication with the service providing apparatus 110.

The operation definition file may include an operation instruction to cause the image processor (e.g., the printer 11 and the image scanner 12) to form an image. An operation instruction for the scan-upload operation and the file conversion is an instruction to cause the image scanner 12 to perform a scanning operation to generate image data and transmit the generated image data to the service providing apparatus 110. An operation instruction for the download-print operation is an instruction to receive image data from the service providing apparatus 110 and cause the printer 11 to record an image based on the received imaged data on a recording sheet.

The operation definition file, which includes an operation instruction, includes an action tag indicating the operation instruction. The action tag is a tag for instructing an element (e.g., the printer 11, the image scanner 12, and a FAX communication interface) included in the MFP 10 to execute a particular operation. As examples of the action tag, a <Copy> tag indicating a copy operation, a <ScanTransmission> tag indicating a scanning operation, a <FAXTransmission> tag indication a FAX transmission operation, and a <Print> tag indicating a printing operation may be cited.

[Service Providing Apparatus]

The service providing apparatus 110 is configured to provide services to the MFP 10. For instance, the service providing apparatus 110 may provide the MFP 10 with a service to store uploaded data, a service to download stored data, and a service to convert a data format.

[Coordinated Operation by MFP with Server]

The MFP 10 is allowed to execute the coordinated operation in cooperation with the server 80. The coordinated operation is started in response to the MFP 10 accepting via the operation interface 24 an instruction to start the coordinated operation. When the coordinated operation is started, the control program 35 (more specifically, the CPU 31 executing the control program 35) stores, into the data storage area 32B, coordinated-operation information representing that the MFP 10 is performing the coordinated operation. Hereinafter, for the sake of explanatory convenience, a state where the coordinated-operation information is stored in the data storage area 32B (i.e., a state where the MFP 10 is performing the coordinated operation in cooperation with the server 80) will be referred to as a "coordinated-operation state." In addition, for the sake of explanatory convenience, a state where the coordinated-operation information is not stored in the data storage area 32B (i.e., a state where the MFP 10 is not performing the coordinated operation in cooperation with the server 80) will be referred to as a "non-coordinated-operation state."

When the MFP 10 is powered on, the coordinated-operation information is not stored in the data storage area 32B. Namely, immediately after powered on, the MFP 10 is in the non-coordinated-operation state. Further, when the MFP 10 is powered on, the control program 35 controls the display 23 to display a standby screen. Information for displaying the standby screen is not information received from the server 80 via the coordinated operation. On the standby screen, a coordinated-operation icon for accepting an instruction to start the coordinated operation is displayed. In response to accepting a user operation of tapping a position of the coordinated-operation icon via the operation interface 24, the control program 35 controls the storage 32 to store the coordinated-operation information into the data storage area 32B, and controls the Wi-Fi communication interface 25 to transmit to the server 80 coordinated-operation start information as a request via HTTP communication.

In response to receiving the coordinated-operation start information from the MFP 10, the server 80 transmits instruction information as a response via the HTTP communication, to the MFP 10 through the communication interface 85. The instruction information includes at least process information and a reply destination URL. The process information indicates a process to be executed by the MFP 10. The reply destination URL is a URL to which a result of the process by the MFP 10 is to be returned, i.e., a URL indicating the server 80.

In response to receiving the instruction information from the server 80, the MFP 10 interprets the received instruction information, and performs a process according to a result of the interpretation. Then, the MFP 10 transmits result information and reply information as a request via the HTTP communication, to the reply destination indicated by the reply destination URL contained in the instruction information. The result information is obtained as a result of the process performed by the MFP 10. The reply information includes identification information contained in the received instruction information.

In response to receiving the reply information from the MFP 10, the server 80 interprets the received reply information. The server 80 identifies which reply destination URL has been used for transmission of the reply information. Then, the server 80 selects a template corresponding to the identified reply destination URL from among a plurality of templates of the instruction information. Further, the server 80 performs a process to acquire content information to be contained in next instruction information, in accordance with the result information contained in the reply information. Further, the server 80 generates instruction information including the acquired content information, by editing the selected template. Then, the server 80 transmits, to the MFP 10, the generated instruction information as a response via the HTTP communication.

In response to receiving the new instruction information from the server 80, the MFP 10 performs a process according to process information contained in the received instruction information. Then, the MFP 10 transmits, to the server 80, new reply information as a request via the HTTP communication. The server 80 performs a process according to the new reply information, and transmits further new instruction information to the MFP 10. Thus, the coordinated operation is implemented by beginning with transmission of the coordinated-operation start information by the MFP 10 and repeatedly communicating the instruction information and the reply information.

Further, when the MFP 10 is in the coordinated-operation state, the control program 35 determines whether a state where there is no input operation via the operation interface 24 has continued for a particular period of time. When determining that the state where there is no input operation via the operation interface 24 has continued for the particular period of time, the control program 35 deletes the coordinated-operation information from the data storage area 32B, and controls the display 23 to display the standby screen. Namely, the MFP 10 is brought into the non-coordinated-operation state. In addition, when the MFP 10 is in the coordinated-operation state, the control program 35 determines whether a particular key (e.g., a key for issuing an instruction to return to the standby screen) of the operation interface 24 has been pressed. When determining that the particular key has been pressed, the control program 35 deletes the coordinated-operation information from the data storage area 32B, and controls the display 23 to display the standby screen.

For instance, the instruction information may be an XML (which is an abbreviated form of "Extensible Markup Language") file including at least one of display information, acquiring unit information, image processor information, and transmission instructing information. The display information indicates contents (e.g., texts and icons) on a screen to be displayed on the display 23. The acquiring unit information indicates an information acquiring unit (e.g., the operation interface 24, the Wi-Fi communication interface 25, and the NFC communication interface 26) for acquiring information or accepting operations. The image processor information indicates an image processor (e.g., the printer 11 and the image scanner 12) that performs image formation. The transmission instructing information indicates transmission of information via the HTTP communication. The display information, the acquiring unit information, the image processor information, and the transmission instructing information are examples of process information.

In response to receiving instruction information, the control program 35 of the MFP 10 interprets information contained in the instruction information. The control program 35 controls the display 23 of the MFP 10 to display a screen in accordance with the display information contained in the instruction information. The control program 35 sets valid an information acquiring unit indicated by the acquiring unit information contained in the instruction information. For instance, the control program 35 enables the NFC communication interface 26 to perform communication via the NFC link. Alternatively, the control program 35 may control the display 23 to display an icon for accepting a tapping operation. Then, the control program 35 acquires information or accepts an operation via the valid information acquiring unit. Further, after completely transmitting the information acquired in accordance with the instruction information to the server 80, the control program 35 sets the valid information acquiring unit invalid, in accordance with one or more definitions of the instruction information. Or, after completely acquiring the information defined in the instruction information, the control program 35 sets the valid information acquiring unit invalid, in accordance with one or more definitions of the instruction information.

The control program 35 controls an image processor (e.g., the printer 11 and the image scanner 12) indicated by the image processor information contained in the instruction information, to perform image formation. The transmission instructing information contains the reply destination URL that indicates a reply destination of information, and information-specifying information that specifies which information is to be transmitted. The control program 35 transmits information specified by the information-specifying information to a reply destination indicated by the reply destination URL, via the HTTP communication. Further, the instruction information containing display information may contain a serial number of the display information. In this case, the control program 35 may determine what serial number is contained in the instruction information, and may identify an information acquiring unit corresponding to the determined serial number. The control program 35 acquires information or accepts an operation via the identified information acquiring unit.

It is noted that a single piece of instruction information may contain a plurality of reply destination URLs. A single piece of instruction information may contain a plurality of pieces of process information, and a plurality of reply destination URLs that are associated with the plurality of pieces of process information, respectively. Further, the MFP 10 is allowed to receive, via the coordinated operation, a service provided by the service providing apparatus 110.

In the present disclosure, for the sake of explanatory convenience, the display information indicating contents on a screen (to be displayed on the display 23) may be described as the display information defining contents on the screen. Likewise, for the sake of explanatory convenience, the acquiring unit information indicating an information acquiring unit may be described as the acquiring unit information defining the information acquiring unit. Likewise, for the sake of explanatory convenience, the image processor information indicating an image processor may be described as the image processor information defining the image processor. Likewise, for the sake of explanatory convenience, the transmission instructing information providing an instruction to transmit information may be described as the transmission instructing information defining transmission of information.

[Control of NFC Communication Interface and Coordinated Operation]

The control program 35 is allowed to set the NFC communication interface 26 into states such as a receivable state, an un-receivable state, a transmittable state, and an un-transmittable state. In the receivable state, the NFC communication interface 26 is capable of receipt of information via near-field wireless communication (hereinafter referred to as "direct wireless reception"). In the un-receivable state, the NFC communication interface 26 is not capable of direct wireless reception. In the transmittable state, the NFC communication interface 26 is capable of transmission of information via near-field wireless communication (hereinafter referred to as "direct wireless transmission"). In the un-transmittable state, the NFC communication interface 26 is not capable of direct wireless transmission.

The "receivable state" is a state where, after establishing the NFC link, the NFC communication interface 26 is allowed to receive information via the NFC link. The "un-receivable state" is a state where the NFC communication interface 26 is not allowed to establish the NFC link, or a state where, even after establishing the NFC link, the NFC communication interface 26 is not allowed to receive information via the NFC link. The "transmittable state" is a state where, after establishing the NFC link, the NFC communication interface 26 is allowed to transmit information via the NFC link. The "un-transmittable state" is a state where the NFC communication interface 26 is not allowed to establish the NFC link, or a state where, even after establishing the NFC link, the NFC communication interface 26 is not allowed to transmit information via the NFC link.

The control program 35 may set the NFC communication interface 26 into the receivable state, by inputting into the NFC communication interface 26 a setting value representing permission to establish the NFC link. The control program 35 may set the NFC communication interface 26 into the receivable state, by turning on the NFC communication interface 26 and further inputting into the NFC communication interface 26 the setting value representing permission to establish the NFC link and a setting value representing permission to receive information via the NFC link. In the illustrative embodiment, in response to the setting value representing permission to establish the NFC link being input into the NFC communication interface 26, the NFC communication interface 26 performs the Poll operation.

When at least one of the setting values is previously stored in the NFC communication interface 26, the control program 35 may omit to input the at least one setting value, after turning on the NFC communication interface 26. Further, when the NFC communication interface 26 is previously powered on, or when the NFC communication interface 26 is automatically turned on to establish the NFC link, the control program 35 may omit to turn on the NFC communication interface 26.

The control program 35 may set the NFC communication interface 26 into the transmittable state, by turning on the NFC communication interface 26 and further inputting into the NFC communication interface 26 the setting value representing permission to establish the NFC link and a setting value representing permission to transmit information via the NFC link. When at least one of the setting values is previously stored in the NFC communication interface 26, the control program 35 may omit to input the at least one setting value, after turning on the NFC communication interface 26. Further, when the NFC communication interface 26 is previously powered on, or when the NFC communication interface 26 is automatically turned on to establish the NFC link, the control program 35 may omit to turn on the NFC communication interface 26.

The control program 35 may set the NFC communication interface 26 into the un-receivable state and the un-transmittable state, by turning off the NFC communication interface 26. The control program 35 may set the NFC communication interface 26 into the un-receivable state and the un-transmittable state, by inputting into the NFC communication interface 26 a setting value representing that establishment of the NFC link is not permitted. In the illustrative embodiment, the NFC communication interface 26 stops the Poll operation. Further, the control program 35 may set the NFC communication interface 26 into the un-receivable state, by inputting into the NFC communication interface 26 a setting value representing that reception of information via the NFC link is not permitted. The control program 35 may set the NFC communication interface 26 into the un-transmittable state, by inputting into the NFC communication interface 26 a setting value representing that transmission of information via the NFC link is not permitted.

When receiving ID information and print data via the Wi-Fi communication interface 25 in a state where the data storage area 32B stores therein a setting value for enabling a secure print function of the MFP 10, the control program 35 does not perform printing based on the received print data. Then, the control program 35 controls the storage 32 to store the received ID information and the received print data into the data storage area 32B in association with each other. Further, when receiving ID information via the NFC communication interface 26, the control program 35 determines whether the received ID information is stored in the data storage area 32B. When determining that the received ID information is stored in the data storage area 32B, the control program 35 reads out print data corresponding to the received ID information from the data storage area 32B, and performs printing based on the read print data.

Further, when receiving an SSID and a print instruction to perform printing based on print data in a state where the data storage area 32B stores therein a setting value for enabling a mobile print function of the MFP 10, the control program 35 establishes a Wi-Fi connection in accordance with the received SSID. Then, the control program 35 receives the print data specified by the print instruction, via Wi-Fi communication, and performs printing based on the print data.

Further, when receiving from the server 80 the instruction information that contains the acquiring unit information indicating the NFC communication interface 26 in a state where the MFP 10 is in the coordinated-operation state, the control program 35 transmits information acquired from one or more NFC devices via the NFC communication interface 26, to the server 80. Therefore, when acquiring information from the NFC devices via the NFC communication interface 26 in a state where the instruction information that contains the acquiring unit information indicating the NFC communication interface 26 has been received from the server 80, the control program 35 might not determine whether to use the acquired information in the secure print function or the mobile print function or whether to transmit the acquired information to the server 80 for the coordinated operation.

Therefore, in the present disclosure, the control program 35 determines whether the coordinated-operation information is stored in the data storage area 32B. When determining that the coordinated-operation information is not stored in the data storage area 32B, the control program 35 sets the NFC communication interface 26 into the receivable state. Then, when the data storage area 32B stores therein the setting value for enabling the secure print function or the mobile print function, the control program 35 executes the secure print function or the mobile print function using the information acquired from the NFC devices via the NFC communication interface 26. Further, when determining that the coordinated-operation information is not stored in the data storage area 32B, the control program 35 does not transmit the information acquired from the NFC devices, to the server 80.

Meanwhile, when determining that the coordinated-operation information is stored in the data storage area 32B, the control program 35 sets the NFC communication interface 26 into the un-receivable state. Nonetheless, when receiving from the server 80 the instruction information that contains the acquiring unit information indicating the NFC communication interface 26, the control program 35 sets the NFC communication interface 26 into the receivable state. Then, the control program 35 transmits the information acquired from the NFC devices via the NFC communication interface 26, to the sever 80 for the coordinated operation. More specifically, the control program 35 transmits the information acquired from the NFC devices via the NFC communication interface 26, to the reply destination indicated by the reply destination URL contained in the instruction information, i.e., to the server 80 as reply information for the coordinated operation.

Then, as the reply information is transmitted, it is considered that the process defined by the received instruction information has been completed. Thus, the control program 35 sets the NFC communication interface 26 into the un-receivable state. Alternatively, in response to acquiring the information from the NFC devices in accordance with the instruction information, the control program 35 may set the NFC communication interface 26 into the un-receivable state. Further, when determining that the coordinated-operation information is stored in the data storage area 32B, the control program 35 does not execute the secure print function or the mobile print function using the information acquired from the NFC devices via the NFC communication interface 26.

When the MFP 10 is in the non-coordinated-operation state, the control program 35 has not received the reply destination URL from the server 80. Therefore, the control program 35 is not allowed to transmit the reply information to the server 80. Further, even though the MFP 10 is in the coordinated-operation state, when the control program 35 has not received the instruction information from the server 80, the control program 35 does not have the reply destination URL. Therefore, the control program 35 is not allowed to transmit the reply information to the server 80. Meanwhile, when the control program 35 has received the instruction information from the server 80, the control program 35 has the reply destination URL. Thus, in this case, the control program 35 is allowed to transmit the reply information to the server 80. Hereinafter, a state where the MFP 10 has received the reply destination URL from the server 80 and is allowed to transmit the reply information to the server 80 will be referred to a "first mode" for the sake of explanatory convenience. Additionally, hereinafter, a state where the MFP 10 has not received the reply destination URL from the server 80 and is not allowed to transmit the reply information to the server 80 will be referred to a "second mode" for the sake of explanatory convenience.

[Operations of Communication System]

Referring to FIGS. 8 to 13, an explanation will be provided of operations of the communication system 100 in the illustrative embodiment, in particular, of an example of the scan-upload operation of generating image data by the image scanner 12 and uploading the generated image data to an FTP server. Before execution of a process shown in FIG. 8, the MFP 10 sets the NFC communication interface 26 into the receivable state and the transmittable state. The MFP 10 is in the second mode. Further, before execution of the process shown in FIG. 8, the mobile terminal device 50 sets the NFC communication interface 56 into the un-receivable state and the un-transmittable state.

First, the control program 35 of the MFP 10 (more specifically, the CPU 31 executing the control program 35) controls the display 23 to display a menu screen (S11). FIG. 10A shows an example of the menu screen. As exemplified in FIG. 10A, the menu screen contains a [Copy] icon, a [Scan] icon, and a [Web] icon. Then, the control program 35 enables the operation interface 24 to accept a user operation to select one of the icons contained in the menu screen.

Next, the control program 35 accepts, via the operation interface 24, a user operation of tapping a position of the [Web] icon (S12). In response to accepting the selection of the [Web] icon, the control program 35 transmits coordinated-operation request information to the server 80 via the Wi-Fi communication interface 25 (S13). Further, the control program 35 sets the NFC communication interface 26 into the un-receivable state and the un-transmittable state. The coordinated-operation request information is information for requesting the server 80 to start the coordinated operation.

Subsequently, the control program 95 of the server 80 (more specifically, the CPU 61 executing the control program 95) receives the coordinated-operation request information from the MFP 10 via the communication interface 85 (S13). In response to receiving the coordinated-operation request information, the control program 95 transmits acquisition instruction information to the MFP 10 via the communication interface 85 (S14).

The acquisition instruction information is information for instructing the MFP 10 to receive shortcut information via the NFC communication interface 26 and accept a selecting operation to select one of a plurality of coordinated operations via the operation interface 24. For instance, the acquisition instruction information contains XML tags that define a coordinated-operation selecting screen, XML tags that instruct the MFP 10 to receive the shortcut information via the NFC communication interface 26, and XML tags that instruct the MFP 10 to accept the selecting operation via the operation interface 24. The XML tags and information between the XML tags contained in the acquisition instruction information are examples of content information.

Next, the control program 35 of the MFP 10 receives the acquisition instruction information from the server 80 via the Wi-Fi communication interface 25 (S14). The control program 35 controls the display 23 to display the coordinated-operation selecting screen defined by the received acquisition instruction information (S15). FIG. 10B shows an example of the coordinated-operation selecting screen. As exemplified in FIG. 10B, the coordinated-operation selecting screen contains coordinated-operation icons and a message "Please hold your mobile terminal device over the MFP." An [S & U] icon is a coordinated-operation icon associated with the scan-upload operation. A [D & P] icon is a coordinated-operation icon associated with the download-print operation.

Further, the control program 35 sets the NFC communication interface 26 into the receivable state and the transmittable state. The MFP 10 comes into the first mode. Thereby, the NFC communication interface 26 repeatedly transmits a polling signal at intervals of a particular period of time. Namely, the control program 35 enables the NFC communication interface 26 to accept shortcut information, and enables the operation interface 24 to accept a selecting operation to select a coordinated operation.

Then, for instance, the control program 35 accepts a selecting operation of tapping a position of the [S & U] icon via the operation interface 24 (S16: Yes). In response to accepting the selection of the [S & U] icon, the control program 35 transmits start request information to the server 80 via the Wi-Fi communication interface 25 (S17). Further, the control program 35 sets the NFC communication interface 26 into the un-receivable state and the un-transmittable state.

The start request information contains a coordinated-operation ID that identifies the selected coordinated-operation corresponding to the tapped coordinated-operation icon, and information that indicates the first one of operation definition files defining the selected coordinated operation. For instance, when the selecting operation of tapping the position of the [S & U] icon is accepted via the operation interface 24, the start request information contains the coordinated-operation ID "001" of the scan-upload operation corresponding to the [S & U] icon, and information "1" as a numeral indicating a first operation definition file. The coordinated-operation ID and the numeral N (N: a variable natural number equal to or more than one) indicating an N-th operation definition file are examples of first identification information that identifies the operation definition information. The control program 95 of the server 80 identifies an operation definition template file, based on the coordinated-operation ID contained the start request information and the numeral indicating the N-th operation definition file.

Hereinafter, a unit operation defined by the N-th operation definition file will be referred to as an "N-th unit operation." It is noted that the N-th operation definition file is the N-th one of the operation definition files to be sequentially transmitted to the MFP 10 in a coordinated operation, i.e., the N-th one of the operation definition files to be sequentially received by the MFP 10 in the coordinated operation. A first operation definition file in a coordinated operation may be a second operation definition file in another coordinated operation.

Subsequently, the control program 95 of the server 80 receives the start request information from the MFP 10 via the communication interface 85 (S17). In response to receiving the start request information, the control program 95 generates the first operation definition file of the scan-upload operation. Specifically, the control program 95 identifies a group of operation definition template files corresponding to the coordinated-operation ID "001" contained in the start request information. Then, the control program 95 identifies "command1_template.xml" that is a template of the first operation definition file in the identified group of operation definition template files.

Next, the control program 95 of the server 80 determines an option to be first selected in the scan-upload operation. The control program 95 additionally writes XML information that indicates the option to be selected and how to select the option, into "command1_template.xml." Thereby, for instance, as shown in FIG. 5A, the first operation definition file "command1.xml" of the scan-upload operation is generated. Then, the control program 95 transmits the generated first operation definition file of the scan-upload operation to the MFP 10 via the communication interface 85 (S34).

Subsequently, the control program 35 of the MFP 10 receives the operation definition file from the server 80 via the Wi-Fi communication interface 25 (S34). The control program 35 determines which one of an option selecting instruction and an operation instruction is included in the received operation definition file (S35).

For instance, in S35, the control program 35 determines which one of an option selecting instruction and an operation instruction is included in the operation definition file, by analyzing contents of the operation definition file. For instance, when the operation definition file includes a component tag, the control program 35 determines that the operation definition file includes an option selecting instruction (S35: Yes). Meanwhile, when the operation definition file includes an action tag, the control program 35 determines that the operation definition file includes an operation instruction (S35: No).

In response to determining that the first operation definition file "command1.xml" (see FIG. 5A) includes the <Option> tags (S35: Yes), the control program 35 controls the display 23 to display an option selecting screen in accordance with the description of the first operation definition file (S36). FIG. 11A shows an example of a first option selecting screen defined in the first operation definition file "command1.xml." As exemplified in FIG. 11A, the first option selecting screen includes respective radio buttons for upload destination options "Storage," "Cloud," and "FTP," and an [OK] icon. Then, the control program 35 enables the operation interface 24 to accept an OP operation to the first option selecting screen. The operation to be executed in S36 is an example of a unit operation.

Subsequently, the control program 35 accepts, via the operation interface 24, an OP selecting operation of tapping a position of the radio button for "FTP" and an OP selecting operation of tapping a position of the [OK] icon (S37). The control program 35 acquires the upload destination option "FTP" corresponding to the selected radio button. Further, the control program 35 reads out a reply destination URL corresponding to the selection completion tag of the [OK] icon, from the first operation definition file. Then, the control program 35 transmits, via the Wi-Fi communication interface 25, next-operation request information to the reply destination of the server 80 that is indicated by the read reply destination URL (S38).

The next-operation request information is information for requesting the server 80 to transmit the (N+1)th operation definition file. For instance, the next-operation request information contains the coordinated-operation ID "001" of the scan-upload operation, and option information (e.g., the upload destination option "FTP") selected in each unit operation from the first unit operation to the N-th unit operation. For instance, the next-operation request information is an HTTP request that contains, as a query parameter or a body parameter, the option information selected for each unit operation from the first unit operation to the N-th unit operation.

Subsequently, the control program 95 of the server 80 receives the next-operation request information from the MFP 10 via the communication interface 85 (S38). The control program 95 identifies the reply destination URL used for transmission of the received next-operation request information, and extracts the option information contained in the next-operation request information. Further, the data storage area 92B stores therein a combination of the identified reply destination URL and the extracted option information in association with an operation definition template file.

The data storage area 92B stores therein association relationship information that indicates which one of the plurality of operation definition template files is associated with the combination of the reply destination URL and the option information. The control program 95 of the server 80 identifies an operation definition template file corresponding to a record containing the combination of the identified reply destination URL and the extracted option information, by referring to the association relationship information stored in the data storage area 92B. In the illustrative embodiment, the operation definition template file associated with a combination of the reply destination URL corresponding to the selection completion tag indicating the [OK] icon and the upload destination option "FTP" is "command4_template.xml."

Subsequently, the control program 95 of the server 80 determines a next option to be selected in the scan-upload operation of uploading the scanned image data to the FTP server. The control program 95 additionally writes XML information that indicates the option to be selected and how to select the option, into "command4_template.xml." Thereby, as shown in FIG. 5B, the second operation definition file "command4.xml" of the scan-upload operation is generated. Then, the control program 95 transmits the generated operation definition file "command4.xml" and the option information contained in the next-operation request information, to the MFP 10 via the communication interface 85 (S34).

Next, the control program 35 of the MFP 10 receives the second operation definition file from the server 80 via the Wi-Fi communication interface 25 (S34). In response to receiving the second operation definition file, the control program 35 again performs S35 and the following steps. As shown in FIG. 5B, the second operation definition file "command4.xml" includes the <Text> tags (S35: Yes). Therefore, the control program 35 controls the display 23 to display a second option selecting screen defined in the second operation definition file (S36).

FIG. 11B shows an example of the second option selecting screen. As exemplified in FIG. 11B, the second option selecting screen includes respective text boxes for displaying a user ID and a password input via the operation interface 24, and an [OK] icon. Then, the control program 35 enables the operation interface 24 to accept an OP selecting operation to the second option selecting screen.

Next, the control program 35 accepts, via the operation interface 24, an OP selecting operation of inputting a user name and a password and an OP selecting operation of tapping a position of the [OK] icon (S37). In response to accepting the selection of the [OK] icon, the control program 35 acquires character strings displayed in the text boxes, as a user ID option "abc" and a password option "123." The control program 35 reads out a reply destination URL corresponding to the selection completion tag of the [OK] icon, from the second operation definition file. Then, the control program 35 transmits, via the Wi-Fi communication interface 25, next-operation request information to the reply destination of the server 80 that is indicated by the read reply destination URL (S38).

Here, the next-operation request information contains the coordinated-operation ID "001," and option information that indicates the upload destination option "FTP," the user ID option "abc," and the password option "123." Namely, the option information contained in the next-operation request information indicates not only the options acquired in the last unit operation but all options acquired in the coordinated operation. In other words, the option information contained in the next-operation request information includes the option information acquired in the last unit operation in addition to the option information received along with the last operation definition information.

In the illustrative embodiment, an explanation will be provided of an example where the option information contains the user ID option "abc" and the password option "123." Nonetheless, a token may be acquired from the service providing apparatus 110 using the user ID "abc" and the password "123." In this case, instead of the user ID option and the password option, the acquired token may be included in the option information as a token option. For instance, this operation may be even defined in the second operation definition file.

Subsequently, the control program 95 of the server 80 receives the next-operation request information from the MFP 10 via the communication interface 85 (S38). The control program 95 identifies an operation definition template file corresponding to a combination of the reply destination URL identified from the received next-operation request information and the option information extracted from the next-operation request information. In the illustrative embodiment, "command5_template.xml" is the operation definition template file associated with the reply destination URL corresponding to the selection completion tag indicating the [OK] icon, the upload destination option "FTP," the user ID option "abc," and the password option "123."

Subsequently, the control program 95 additionally writes XML information that indicates a next option to be selected and how to select the option, into "command5_template.xml." Thereby, as shown in FIG. 6, a third operation definition file "command5.xml" of the scan-upload operation is generated. Then, the control program 95 transmits the generated operation definition file "command5.xml" and the option information contained in the next-operation request information, to the MFP 10 via the communication interface 85 (S34).

Next, the control program 35 of the MFP 10 receives the third operation definition file from the server 80 via the Wi-Fi communication interface 25 (S34). In response to receiving the third operation definition file, the control program 35 again performs S35 and the following steps. As shown in FIG. 6, the third operation definition file "command5.xml" includes the <Option> tags (S35: Yes). Therefore, the control program 35 controls the display 23 to display a third option selecting screen defined in the third operation definition file (S36).

FIG. 12A shows an example of the third option selecting screen. As exemplified in FIG. 12A, the third option selecting screen includes respective radio buttons for file format options "TIFF" and "PDF," respective radio options for scanning resolution options "Low," "Middle," and "High," and an [OK] icon. Then, the control program 35 enables the operation interface 24 to accept an OP selecting operation to the third option selecting screen.

Next, the control program 35 accepts, via the operation interface 24, an OP selecting operation of tapping a position of the radio button corresponding to "PDF," an OP selecting operation of tapping a position of the radio button corresponding to "Low," and an OP selecting operation of tapping a position of the [OK] icon (S37). In response to accepting the selection of the [OK] icon, the control program 35 acquires the file format option "PDF" and the scanning resolution option "Low." Further, the control program 35 transmits, via the Wi-Fi communication interface 25, next-operation request information to a reply destination of the server 80 that is indicated by a reply destination URL corresponding to the selection completion tag of the [OK] icon (S38). Here, the next-operation request information contains the coordinated-operation ID "001," and option information that indicates the upload destination option "FTP," the user ID option "abc," the password option "123," the file format option "PDF," and the scanning resolution option "Low."

Subsequently, the control program 95 of the server 80 receives the next-operation request information from the MFP 10 via the communication interface 85 (S38). The control program 95 identifies an operation definition template file corresponding to a combination of the reply destination URL identified from the received next-operation request information and the option information extracted from the next-operation request information. In the illustrative embodiment, "command6_template.xml" is the operation definition template file associated with the reply destination URL corresponding to the selection completion tag indicating the [OK] icon, the upload destination option "FTP," the user ID option "abc," the password option "123," the file format option "PDF," and the scanning resolution option "Low."

The operation definition template file "command6_template.xml" contains an operation instruction. In response to the operation definition template file containing the operation instruction being identified, the control program 95 of the server 80 determines that all options required for the scan-upload operation of uploading the scanned image data to the FTP server have been selected. Subsequently, the control program 95 additionally writes the option information contained in the next-operation request information into "command6_template.xml." Thereby, for instance, as shown in FIG. 7, a fourth operation definition file "command6.xml" of the scan-upload operation is generated. Then, the control program 95 transmits the generated operation definition file "command6.xml" to the MFP 10 via the communication interface 85.

Next, the control program 35 of the MFP 10 receives the fourth operation definition file from the server 80 via the Wi-Fi communication interface 25 (S34). In response to receiving the fourth operation definition file, the control program 35 again performs S35 and the following steps. As shown in FIG. 7, the fourth operation definition file "command6.xml" includes <ScanTransmission> tags (S35: No). Therefore, the control program 35 performs an operation specified by the operation instruction (S39). Further, the control program 35 transmits, via the Wi-Fi communication interface 25, next-operation request information to a reply destination of the server 80 that is indicated by a reply destination URL corresponding to the <ScanTransmission> tags (S40). Here, the next-operation request information contains operation result information representing completion of the scan transmission.

Subsequently, the control program 95 of the server 80 receives the next-operation request information from the MFP 10 via the communication interface 85 (S40). Then, in response to the received next-operation request information containing the operation result information, the control program 95 determines that the scan-upload operation has been completed. Further, the control program 95 transmits the acquisition instruction information that defines the coordinated-operation selecting screen shown in FIG. 10B, to the MFP 10 via the communication interface 85. In other words, when receiving the next-operation request information containing the operation result information, the control program 95 performs a process common to when coordinated-operation request information is received.

The control program 35 receives the acquisition instruction information from the server 80 via the Wi-Fi communication interface 25, and controls the display 23 to display the coordinated-operation selecting screen. Namely, in response to receiving the acquisition instruction information as a reply to the next-operation request information containing the operation result information, the control program 35 performs a process of S15. Thereafter, when there is not any operation to the coordinated-operation selecting screen for a particular period of time, the MFP 10 is brought into the non-coordinated-operation state. When the MFP 10 is brought into the non-coordinated-operation state, the control program 35 sets the NFC communication interface 26 into the receivable state and the transmittable state. The MFP 10 comes into the second mode. The operation to be executed in S39 is an example of a unit operation.

In S39, the control program 35 controls an image processor (e.g., the printer 11 and the image scanner 12) to perform an operation specified by the operation instruction, in accordance with the options selected in the unit operations so far. The options selected in the unit operations so far are described in the last operation definition file containing the operation instruction. In the illustrative embodiment, in S39, the control program 35 transmits PDF data generated by the image scanner 12 with the scanning resolution "Low," to the FTP server using the user ID "abc" and the password "123."

Meanwhile, the user holding the mobile terminal device 50 is allowed to perform the scan-upload operation from the middle, by operating the mobile terminal device 50 in a state where the coordinated-operation selecting screen is displayed on the display 23 of the MFP 10 (S15).

First, the control program 65 of the mobile terminal device 50 controls the display 53 to display an SC list screen (S18). FIG. 13A shows an example of the SC list screen. As exemplified in FIG. 13A, the SC list screen includes shortcut names contained in the shortcut information stored in the data storage area 62B, respective checkboxes corresponding to the shortcut names, and an [OK] icon. Then, the control program 65 enables the user interface 54 to accept a first SC selecting operation to the SC list screen.

Next, the control program 65 accepts, via the user interface 54, a first SC selecting operation of tapping respective positions of one or more checkboxes and another first SC selecting operation of tapping a position of the [OK] icon (S19). In response to accepting the selection of the [OK] icon, the control program 65 determines whether the shortcut information corresponding to the checked checkbox contains all of option information necessary for the shortcut information (S20). When determining that the shortcut information corresponding to the checked checkbox does not contain all of necessary option information (S20: No), the control program 65 performs an option acquiring process to acquire the necessary option information (S21). Meanwhile, when determining that the shortcut information corresponding to the checked checkbox contains all of necessary option information (S20: Yes), the control program 65 skips S21.

In the illustrative embodiment, the following description will be provided based on an assumption that the checkboxes corresponding to "Scan to Cloud" and "Scan to FTP" are selected as shown in FIG. 13A. The control program 65 may store, into the data storage area 62B, shortcut information selected in the last first SC selecting operation. Then, the control program 65 may previously check the checkbox corresponding to the shortcut information selected in the last first SC selecting operation, on the SC list screen displayed on the display 53 in S18.

Further, as shown in FIG. 3, all of option information necessary for "Scan to Cloud" is already contained in the corresponding shortcut information. Meanwhile, option information on the token option necessary for "Scan to FTP" is not contained in the corresponding shortcut information. Hence, the control program 65 performs an option acquiring process to acquire the token option. It is noted that a specific procedure of the option acquiring process differs depending on options to be acquired.

Specifically, the control program 65 controls the display 53 to display a screen that prompts the user to input a user ID and a password, and accepts a user operation of inputting the user ID and the password via the user interface 54. Subsequently, the control program 65 transmits the user ID and the password to the service providing apparatus 110 via the mobile communication interface 55. Next, the control program 65 receives a token issued in association with the transmitted user ID and the transmitted password, from the service providing apparatus 110 via the mobile communication interface 55.

Then, the control program 65 adds the received token into the shortcut information of the shortcut ID "001-3" as a token option. Thereby, the option acquiring process is not required for next usage of the shortcut information of the shortcut ID "001-3." Instead of the token option, the control program 65 may add a user ID option and a password option as option information to be contained in the shortcut information.

Next, the control program 65 controls the display 53 to display a near-field instruction screen (S22). FIG. 13B shows an example of the near-field instruction screen. As exemplified in FIG. 13B, the near-field instruction screen includes a message "Please hold the mobile terminal device over the MFP." and a message "Now monitoring polling signals." Further, the control program 65 sets the NFC communication interface 56 into the receivable state and transmittable state. Namely, after the first SC selecting operation is accepted, the NFC communication interface 56 starts a "Listen" operation.

Subsequently, when the mobile terminal device 50 is brought within a range communicable with the MFP 10 via NFC communication, an NFC link is established between the MFP 10 and the mobile terminal device 50 (S23). Then, when the NFC link is established, the control program 35 of the MFP 10 transmits apparatus type information to the mobile terminal device 50 via the NFC communication interface 26 (S24). The apparatus type information is information for identifying a type of the MFP 10. For instance, the apparatus type information may be a model name of the MFP 10. The establishment of the NFC link is an example of a near-field wireless connection.

Subsequently, the control program 65 of the mobile terminal device 50 receives the apparatus type information from the MFP 10 via the NFC communication interface 56 (S24). The control program 65 determines whether the MFP 10 of the type identified by the apparatus type information is allowed to execute the coordinated operation indicated by the shortcut information selected on the SC list screen (S25).

For instance, the mobile terminal device 50 may determine whether a model name indicated by the apparatus type information is on a list of model names of MFPs 10 that are allowed to execute the coordinated operation. The list of model names may be stored in the data storage area 62B, or may be acquired from another server on the Internet 101. The same applies to a below-mentioned determining process (S43) by the server 80.

When determining that the MFP 10 of the type identified by the apparatus type information is not allowed to execute the coordinated operation indicated by the shortcut information selected on the SC list screen (S25: No), the control program 65 transmits error information to the MFP 10 via the NFC communication interface 56 (S26). The error information indicates that the MFP 10 of the identified type is not allowed to execute the selected coordinated operation. Further, the control program 65 sets the NFC communication interface 56 into the un-receivable state and the un-transmittable state. Additionally, the control program 35 of the MFP 10 receives the error information from the mobile terminal device 50 via the NFC communication interface 26 (S26). Then, the control program 35 controls the display 23 to display the contents of the received error information. After that, when the MFP 10 comes into the non-coordinated-operation state, the control program 35 sets the NFC communication interface 26 into the receivable state and the transmittable state. The MFP 10 comes into the second mode.

Meanwhile, when determining that the MFP 10 of the type identified by the apparatus type information is allowed to execute the coordinated operation indicated by the shortcut information selected on the SC list screen (S25: Yes), the control program 65 of the mobile terminal device 50 transmits the shortcut information selected by the first SC selecting operation, to the MFP 10 via the NFC communication interface 56 (S27). In the illustrative embodiment, two piece of shortcut information of the shortcut IDs "001-2" and "001-3" are transmitted. Further, the control program 65 sets the NFC communication interface 56 into the un-receivable state and the un-transmittable state.

Next, the control program 35 of the MFP 10 receives the shortcut information from the mobile terminal device 50 via the NFC communication interface 26 (S27). The control program 35 transits the received shortcut information to the server 80 via the Wi-Fi communication interface 25 (S28). Further, the control program 35 sets the NFC communication interface 26 into the un-receivable state and the un-transmittable state.

Subsequently, the control program 95 of the server 80 receives the shortcut information from the MFP 10 via the communication interface 85 (S28). The control program 95 determines whether the received shortcut information contains a plurality of pieces of shortcut information (S29).

When determining that the received shortcut information contains a plurality of pieces of shortcut information (S29: Yes), the control program 95 transmits selection instruction information to the MFP 10 via the communication interface 85 (S30). The selection instruction information is information that instructs the MFP 10 to accept, via the operation interface 24, a second SC selecting operation to select one of the plurality of pieces of shortcut information. For instance, the selection instruction information contains XML tags that define an SC selecting screen, and XML tags that instruct the MFP 10 to accept the second SC selecting operation via the operation interface 24. Meanwhile, the selection instruction information does not contain XML tags that instruct the MFP 10 to receive information via the NFC communication interface 26. The XML tags included in the selection instruction information and information between the XML tags are examples of content information.

Subsequently, the control program 35 of the MFP 10 receives the selection instruction information from the server 80 via the Wi-Fi communication interface 25 (S30). The control program 35 controls the display 23 to display the SC selecting screen defined by the received selection instruction information (S31). Then, the control program 35 enables the operation interface 24 to accept the second SC selecting operation to select one of the icons included in the SC selecting screen.

FIG. 12B shows an example of the SC selecting screen. As exemplified in FIG. 12B, the SC selecting screen includes shortcut icons. A [Scan to Cloud] icon is a shortcut icon corresponding to the shortcut ID "001-2." A [Scan to FTP] icon is a shortcut icon corresponding to the shortcut ID "001-3." On each of the shortcut icons, a shortcut name contained in the corresponding shortcut information is displayed.

For instance, the control program 35 accepts, via the operation interface 24, the second SC selecting operation of tapping a position of the [Scan to FTP] icon (S32). The control program 35 transmits the shortcut information corresponding to the icon selected by the second SC selecting operation, to the server 80 via the Wi-Fi communication interface 25 (S33). Namely, in the illustrative embodiment, the shortcut information of the shortcut ID "001-3" is transmitted. It is noted that since the shortcut information has already been transmitted in S28, only the shortcut ID of the shortcut information selected by the second SC selecting operation may be transmitted in S33.

Subsequently, the control program 95 of the server 80 receives the shortcut information from the MFP 10 via the communication interface 85 (S33). The control program 95 transmits an operation definition file indicated by the received shortcut information and option information contained in the shortcut information, to the MFP 10 via the communication interface 85 (S34). Further, in S29, when determining that the received shortcut information contains a single piece of shortcut information (S29: No), the control program 95 goes to S34 without executing S30 to S33. Since the processes of S34 and the following steps have already been described, redundant explanations thereof will be omitted.

Based on the shortcut ID and the option information, the control program 95 identifies the operation definition file indicated by the shortcut information, e.g., in the following manner. Nonetheless, the method for identifying the operation definition file is not limited to the following manner. For instance, instead of the shortcut ID, a reply destination URL may be contained in the shortcut information.

In the illustrative embodiment, the control program 95 extracts the shortcut ID and the option information contained in the received shortcut information. Further, the data storage area 92B stores therein an association relationship between combinations each including a shortcut ID and option information, and operation definition template files. The control program 95 identifies an operation definition template file stored in the data storage area 92B in association with the combination of the extracted shortcut ID and the extracted option information. Here, the operation definition template file "command5_template.xml" is identified.

Then, the control program 95 determines a next option to be selected in the scan-upload operation of uploading the scanned image data to the FTP server. The control program 95 additionally writes XML information that indicates the option to be selected and how to select the option, into "command5_template.xml." Thereby, for instance, as shown in FIG. 6, the third operation definition file "command5.xml" of the scan-upload operation is generated. Then, the control program 95 transmits the generated operation definition file "command5.xml" of the scan-upload operation and the option information contained in the next-operation request information, to the MFP 10 via the communication interface 85 (S34).

Operations and Advantageous Effects of Illustrative Embodiment

According to the aforementioned illustrative embodiment, it is possible to omit the unit operations defined by the operation definition files "command1.xml" and "command4.xml" and start the coordinated operation from the unit operation defined by the operation definition file "command5.xml." Further, the options to be selected in the omitted unit operations may be previously stored in the mobile terminal device 50, or may be acquired by the mobile terminal device 50.

Thus, the MFP 10 of the aforementioned illustrative embodiment is allowed to execute the coordinated operation from which the first to (M−1)th unit operations are omitted, by transmitting to the server 80 the shortcut information received from the mobile terminal device 50 via NFC communication. Further, it is possible to execute the coordinated operation from the beginning by selecting the corresponding one of the coordinated-operation icons. Therefore, even though the user does not have customized shortcut information, the user is allowed to cause the MFP 10 to execute the coordinated operation.

In the aforementioned illustrative embodiment, an explanation has been provided of an example where the MFP 10 performs the steps S23 to S27 in response to receiving in S14 the acquisition instruction information including the XML tags that instruct the MFP 10 to receive the shortcut information via the NFC communication interface 26. Nonetheless, more specifically, the acquisition instruction information received in S14 may include XML tags that instruct the MFP 10 to transmit the apparatus type information via the NFC communication interface 26, and XML tags that instruct the MFP 10 to receive the error information or the SC information via the NFC communication interface 26.

Alternatively, the MFP 10 may receive, from the server 80, transmission instruction information that instructs the MFP 10 to transmit the apparatus type information via the NFC communication interface 26. Subsequently, the MFP 10 may execute the process of S24 in accordance with the received transmission instruction information. Subsequently, the MFP 10 may provide the server 80 with a notification that transmission of the apparatus type information in accordance with the transmission instruction information has been completed. Subsequently, the MFP 10 may receive, from the server 80, acquisition instruction information that instructs the MFP 10 to receive error information or SC information via the NFC communication interface 26. Then, the MFP 10 may execute S27 and the following steps in accordance with the received acquisition instruction information.

In the aforementioned illustrative embodiment, an explanation has been provided of an example where, in the flowcharts shown in FIGS. 8 and 9, both the state of the NFC communication interface 26 and the mode of the MFP 10 are switched. Nonetheless, the NFC communication interface 26 may always be maintained in the receivable state, and only the mode of the MFP 10 may be switched. For instance, in response to receiving the acquisition instruction information from the server 80, the MFP 10 in the second mode may be set into the first mode. Further, in response to transmitting the start request information or the SC information to the server 80, the MFP 10 may be set into the second mode.

The control program 35 may control the NFC communication interface 26 to operate in the P2P mode. In this case, the receivable state of the NFC communication interface 26 may be a state where both the direct wireless transmission and the direct wireless reception are permitted. Meanwhile, the un-receivable state may be a state where the direct wireless transmission is permitted, and the direct wireless reception is restricted. Further, the control program 35 may control the NFC communication interface 26 to operate in the CE mode. The receivable state of the NFC communication interface 26 operating in the CE mode may be, for instance, a state where the NFC communication interface 26 is performing the "Listen" operation. Furthermore, the un-receivable state of the NFC communication interface 26 operating in the CE mode may be, for instance, a state where the NFC communication interface 26 stops the "Listen" operation.

Further, the communication method for transmitting the shortcut information from the mobile terminal device 50 to the MFP 10 is not limited to NFC communication. The MFP 10 and the mobile terminal device 50 may transmit and receive information (e.g., SSID) required for establishment of a Wi-Fi direct connection, via NFC communication. Then, the mobile terminal device 50 may establish the Wi-Fi direct connection and transmit the shortcut information to the MFP 10 via the Wi-Fi direct communication. Namely, NFC communication may be used for a part of a procedure of transmitting and receiving the shortcut information between the MFP 10 and the mobile terminal device 50.

Further, according to the aforementioned illustrative embodiment, it is possible to manage the shortcut information customized for each user, at the side of the mobile terminal device 50 of each user. Specifically, it is possible to previously store, in the mobile terminal device 50, option information selectable in unit operations to be omitted. Therefore, it is possible to enhance flexibility for customizing the shortcut information. Further, it is possible to previously store a plurality of pieces of frequently-used shortcut information in the mobile terminal device 50, and to select shortcut information that the user wishes to use from now from among the plurality of pieces of shortcut information stored in the mobile terminal device 50, at the side of the MFP 10. Consequently, it is possible to easily find an intended one of the plurality of pieces of shortcut information.

Further, according to the aforementioned illustrative embodiment, the mobile terminal device 50 determines whether the MFP 10 is allowed to execute the coordinated operation indicated by the selected shortcut information (S25). Consequently, even though the server 80 supports a new coordinated operation, there is no need to update programs of the MFP 10. Further, the determining process of S25 may not necessarily be performed by the mobile terminal device 50. As will be described in a below-mentioned modification, a determining process of S43 may be performed by the server 80.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

Modifications

Referring to FIG. 14, an explanation will be provided of a communication system 100 in a modification. Regarding features in common with the aforementioned illustrative embodiment, a detailed explanation thereof will be omitted. The following description will mainly be focused on differences from the aforementioned illustrative embodiment. The communication system 100 of the modification is different from the aforementioned illustrative embodiment in that the server 80 determines whether the MFP 10 is allowed to execute a coordinated operation indicated by shortcut information. Namely, in the modification, the steps S24 to S26 are omitted.

Before execution of a process shown in FIG. 14, firstly, the MFP 10 sets the NFC communication interface 26 into the receivable state. The MFP 10 is in the first mode. Further, before execution of the process shown in FIG. 14, the mobile terminal device 50 sets the NFC communication interface 56 into the transmittable state. Then, the control program 65 of the mobile terminal device 50 transmits shortcut information to the MFP 10 via the NFC communication interface 56 (S41). Further, the control program 65 sets the NFC communication interface 56 into the un-transmittable state.

Subsequently, the control program 35 of the MFP 10 receives the shortcut information from the mobile terminal device 50 via the NFC communication interface 26 (S41). The control program 35 transmits the received shortcut information and apparatus type information to the server 80 via the Wi-Fi communication interface 25 (S42). Further, the control program 35 sets the NFC communication interface 26 into the un-receivable state.

Next, the control program 95 of the server 80 receives the shortcut information and the apparatus type information from the MFP 10 via the communication interface 85 (S42). The control program 95 determines whether the MFP 10 of the type identified by the apparatus type information is allowed to execute the coordinated operation indicated by the received shortcut information (S43).

When determining that the MFP 10 of the type identified by the apparatus type information is not allowed to execute the coordinated operation indicated by the received shortcut information (S43: No), the control program 95 transmits error information to the MFP 10 via the communication interface 85 (S44). Meanwhile, when determining that the MFP 10 of the type identified by the apparatus type information is allowed to execute the coordinated operation indicated by the received shortcut information (S43: Yes), the control program 95 transmits an operation definition file specified by the received shortcut information and option information contained in the received shortcut information, to the MFP 10 via the communication interface 85 (S45). Since the other processes are in common with the aforementioned illustrative embodiment, redundant explanations thereof will be omitted.

According to the modification, there is no need to implement the process of determining whether the MFP 10 is allowed to execute the coordinated operation indicated by the shortcut information into the MFP 10 as exemplified in the aforementioned illustrative embodiment. Consequently, before an attempt to perform a new coordinated operation by the MFP 10, it is possible to properly determine whether the new coordinated operation is executable by the MFP 10.

In the aforementioned illustrative embodiment and the modification, each of the aforementioned processes by the MFP 10 is implemented when the CPU 31 executes the control program 35 stored in the program storage area 32A of the storage 32. Likewise, each of the aforementioned processes by the mobile terminal device 50 is implemented when the CPU 61 executes the control program 65 stored in the program storage area 62A of the storage 62. Further, each of the aforementioned processes by the server 80 is implemented when the CPU 91 executes the control program 95 stored in the program storage area 92A of the storage 92. Nonetheless, regarding the processes by each of the MFP 10, the mobile terminal device 50, and the server 80, a part or all of them may be implemented by hardware such as one or more integrated circuits.

Further, aspects of the present disclosure achieved as the MFP 10, the mobile terminal device 50, and the server 80 may be achieved as programs that cause the MFP 10, the mobile terminal device 50, and the server 80 to perform the processes. The programs may be provided as being stored in non-transitory computer-readable media including but not limited to RAMs, ROMs, flash memories, EEPROMs, CD-media, DVD-media, hard disk drives, floppy drives, and storage coupled with a server that is connectable with the MFP 10, the mobile terminal device 50, and the server 80 via a communication network. The programs may be delivered as information or signals indicating the programs, via the communication network such as the Internet.

What is claimed is:

1. A communication system comprising:
   a mobile terminal device;
   a server on an Internet; and
   an image processing apparatus comprising:
      an image processor;
      a first network interface;
      an operation interface; and
      a first controller configured to execute a coordinated operation by sequentially performing a plurality of unit operations included in the coordinated operation, the plurality of unit operations being respectively defined by a plurality of pieces of operation definition information sequentially received from the server, the first controller being further configured to: execute the coordinated operation by:
         receiving N-th operation definition information of the plurality of pieces of operation definition information from the server via the first network interface using wireless communication, N being a variable natural number equal to or more than one, the N-th operation definition information being for defining an N-th unit operation included in the coordinated operation;
         determining which one of an option selecting instruction and an operation instruction is included in the received N-th operation definition information;
         in response to determining that the N-th operation definition information includes the option selecting instruction to select one of options selectable in the coordinated operation, setting the operation interface into an acceptable state where the operation interface is allowed to accept an option selecting operation to select one of the selectable options;
         in response to accepting the option selecting operation via the operation interface, transmitting next-operation request information to the server via the first network interface using wireless communication, the next-operation request information being for requesting the server to transmit (N+1)th operation definition information that defines an (N+1)th unit operation following the N-th unit operation in the coordinated operation; and
         in response to determining that the N-th operation definition information includes the operation instruction that instructs the image processor to perform image processing, controlling the image processor to perform image processing as instructed by the operation instruction, in accordance with the selected option; and
         in response to receiving shortcut information from the mobile terminal device via the first network interface using wireless communication, transmit the received shortcut information to the server via the first network interface using wireless communication, the shortcut information indicating that the coordinated operation is started from an M-th unit operation of the plurality of unit operations, the M-th unit operation being defined by M-th operation definition information, M being a specific natural number equal to or more than two, wherein the server comprises:
   a second network interface configured to communicate with an external device via the Internet; and
   a second controller configured to:
      receive the shortcut information from the image processing apparatus via the second network interface;
      in response to receiving the shortcut information, transmit the M-th operation definition information to the image processing apparatus via the second network interface;
      receive the next-operation request information from the image processing apparatus via the second network interface; and
      in response to receiving the next-operation request information, transmit the (N+1)th operation definition information to the image processing apparatus via the second network interface, and wherein the mobile terminal device comprises:
   a user interface;
   a storage configured to store the shortcut information;
   a third network interface; and
   a third controller configured to:
      accept, via the user interface, a first shortcut selecting operation to select the shortcut information stored in the storage; and
      transmit the shortcut information selected by the first shortcut selecting operation, to the image processing apparatus via the third network interface.

2. The communication system according to claim 1,
wherein the first network interface comprises:
   an apparatus-side communication interface configured to communicate with the server via the Internet; and
   an apparatus-side near-field communication interface configured to perform near-field wireless communication with the mobile terminal device, using a near-field wireless communication protocol, wherein the first controller is further configured to:
   execute the coordinated operation by:
      receiving the N-th operation definition information of the plurality of pieces of operation definition information from the server via the apparatus-side communication interface;
      determining which one of the option selecting instruction and the operation instruction is included in the received N-th operation definition information;
      in response to determining that the N-th operation definition information includes the option selecting instruction, setting the operation interface into the acceptable state where the operation interface is allowed to accept the option selecting operation;
      in response to accepting the option selecting operation via the operation interface, transmitting the next-operation request information to the server via the apparatus-side communication interface; and
      in response to determining that the N-th operation definition information includes the operation instruction, controlling the image processor to perform image processing as instructed by the operation instruction, in accordance with the selected option;
   set the apparatus-side near-field communication interface into a receivable state where the apparatus-side near-field communication interface is allowed to receive the shortcut information from the mobile terminal device; and
   in response to receiving the shortcut information from the mobile terminal device via the apparatus-side near-filed communication interface, transmit the received shortcut information to the server via the apparatus-side communication interface, wherein the third network interface comprises a terminal-side near-field communication interface configured to communicate with the image processing apparatus, using the near-field wireless communication protocol, and wherein the third controller is further configured to transmit the shortcut information selected by the first shortcut selecting operation, to the image processing apparatus via the terminal-side near-field communication interface.

3. The communication system according to claim 2,
wherein the first controller is further configured to:
   accept, via the operation interface, a start operation to issue an instruction to start the coordinated operation;
   in response to accepting the start operation, transmit coordinated-operation request information to the server via the apparatus-side communication interface, the coordinated-operation request information being for requesting the server to start the coordinated operation;
   receive acquisition instruction information from the server via the apparatus-side communication interface, the acquisition instruction information being for instructing the image processing apparatus to receive the shortcut information via the apparatus-side near-field communication interface; and
   in response to receiving the acquisition instruction information, set the apparatus-side near-field communication interface into the receivable state where the apparatus-side near-field communication interface is allowed to receive the shortcut information from the mobile terminal device, and wherein the second controller is further configured to:
   receive the coordinated-operation request information from the image processing apparatus via the second network interface; and
   in response to receiving the coordinated-operation request information, transmit the acquisition instruction information to the image processing apparatus via the second network interface.

4. The communication system according to claim 3,
wherein the second controller is further configured to transmit the acquisition instruction information to the image processing apparatus via the second network interface, the acquisition instruction information being for instructing the image processing apparatus to receive the shortcut information via the apparatus-side near-field communication interface and accept a selecting operation to select one of a plurality of coordinated operations via the operation interface, and wherein the first controller is further configure to:
receive the acquisition instruction information from the server via the apparatus-side communication interface;
in response to receiving the acquisition instruction information, set the operation interface into an acceptable state where the operation interface is allowed to accept the selecting operation to select one of the plurality of coordinated operations, and set the apparatus-side near-field communication interface into the receivable state where the apparatus-side near-field communication interface is allowed to receive shortcut information from the mobile terminal device; and
in response to accepting the selecting operation, transmit start request information to the server via the apparatus-side communication interface, the start request information being for requesting the server to transmit first operation definition information of the plurality of pieces of operation definition information, the first operation definition information being for defining a first unit operation of the coordinated operation.

5. The communication system according to claim 2,
wherein the storage stores two or more pieces of shortcut information,
wherein the third controller is further configured to:
accept, via the user interface, the first shortcut selecting operation to select a plurality of pieces of shortcut information from the two or more pieces shortcut information stored in the storage; and
transmit the plurality of pieces of shortcut information selected by the first shortcut selecting operation, to the image processing apparatus via the terminal-side near-field communication interface,
wherein the second controller is further configured to:
in response to receiving the plurality of pieces of shortcut information from the image processing apparatus via the second network interface, transmit selection instruction information to the image processing apparatus via the second network interface, the selection instruction information being for instructing the image processing apparatus to accept via the operation interface a second shortcut selecting operation to select one of the plurality of pieces of shortcut information, and
wherein the first controller is further configured to:
receive the selection instruction information from the server via the apparatus-side communication interface;
in response to receiving the selection instruction information, set the operation interface into an acceptable state where the operation interface is allowed to accept the second shortcut selecting operation; and
in response to accepting the second shortcut selecting operation via the operation interface, transmit the selected piece of shortcut information to the server via the apparatus-side communication interface.

6. The communication system according to claim 2,
wherein the shortcut information comprises:
identification information that identifies the M-th operation definition information; and
option information indicating one or more particular options, the one or more particular options comprising one or more options that are selectable in each unit operation of first to (M-1)th unit operations and are to be used in each unit operation of the M-th and following unit operations, and
wherein the third controller is further configured to:
in response to determining that the shortcut information selected by the first shortcut selecting operation does not contain all of the option information necessary for the selected shortcut information, acquire necessary option information that is not contained in the shortcut information; and
transmit the shortcut information containing the identification information and all of the necessary option information, to the image processing apparatus via the terminal-side near-field communication interface.

7. The communication system according to claim 6,
wherein the third network interface further comprises a terminal-side communication interface configured to communicate with a service providing apparatus via the Internet,
wherein the coordinated operation comprises a unit operation to perform data communication with the service providing apparatus on the Internet, and
wherein the third controller is further configured to receive authentication information as the necessary option information from the service providing apparatus via the terminal-side communication interface, the authentication information representing authority to perform data communication with the service providing apparatus.

8. The communication system according to claim 2,
wherein the coordinated operation comprises a particular unit operation to cause the image processor to perform image processing, and
wherein the options selectable in the coordinated operation include an execution parameter for the image processor in the particular unit operation.

9. The communication system according to claim 2,
wherein the coordinated operation comprises a particular unit operation to cause a service providing apparatus on the Internet to perform, and
wherein the options selectable in the coordinated operation include an execution parameter for the service providing apparatus in the particular unit operation.

10. The communication system according to claim 2,
wherein the first controller is configure to, in response to the apparatus-side near-field communication interface performing near-field wireless communication with the mobile terminal device, transmit apparatus type information to the mobile terminal device via the apparatus-side near-field communication interface, the apparatus type information being for identifying a type of the image processing apparatus, and
wherein the third controller is further configured to:
receive the apparatus type information from the image processing apparatus via the terminal-side near-field communication interface;
determine whether the image processing apparatus of the type identified by the apparatus type information is allowed to execute the coordinated operation indicated by the shortcut information selected by the first shortcut selecting operation; and
in response to determining that the image processing apparatus of the type identified by the apparatus type information is allowed to execute the coordinated operation indicated by the selected shortcut information, transmit the selected shortcut information to the image processing apparatus via the terminal-side near-field communication interface.

11. The communication system according to claim 2,
wherein the first controller is further configured to, in response to receiving the shortcut information from the mobile terminal device via the apparatus-side near-field communication interface, transmit the received shortcut information and apparatus type information to the server via the apparatus-side communication interface, the apparatus type information being for identifying a type of the image processing apparatus, and
wherein the second controller is further configured to:
in response to receiving the shortcut information and the apparatus type information, determine whether the image processing apparatus of the type identified by the apparatus type information is allowed to execute the coordinated operation indicated by the shortcut information selected by the first shortcut selecting operation; and
in response to determining that the image processing apparatus of the type identified by the apparatus type information is allowed to execute the coordinated operation indicated by the selected shortcut information, transmit the M-th operation definition information to the image processing apparatus via the second network interface.

12. The communication system according to claim 2,
wherein the next-operation request information comprises first identification information that identifies the (N+1)th operation definition information, and option information that indicates the selected option,
wherein the shortcut information comprises second identification information that identifies the M-th operation definition information,
wherein a data format of the second identification information is different from a data format of the next-operation request information, and
wherein a data size of the second identification information is smaller than a data size of the next-operation request information.

13. The communication system according to claim 1,
wherein the first network interface is configured to perform indirect communication with the server via a communication device and perform direct communication with at least one of the mobile terminal device and the server without involving any communication device,
wherein the first controller is further configured to:
execute the coordinated operation by:
receiving the N-th operation definition information of the plurality of pieces of operation definition information from the server via the indirect communication;
determining which one of the option selecting instruction and the operation instruction is included in the received N-th operation definition information;
in response to determining that the N-th operation definition information includes the option selecting instruction, setting the operation interface into the acceptable state;
in response to accepting the option selecting operation via the operation interface, transmitting the next-operation request information to the server via the indirect communication; and
in response to determining that the N-th operation definition information includes the operation instruction, controlling the image processor to perform image processing as instructed by the operation instruction, in accordance with the selected option;
set the first network interface into the receivable state; and
in response to receiving the shortcut information from the mobile terminal device via the direct communication, transmit the received shortcut information to the server via the direct communication,
wherein the third network interface is configured to perform the direct communication with the image processing apparatus, and
wherein the third controller is further configured to transmit the shortcut information selected by the first shortcut selecting operation, to the image processing apparatus via the direct communication.

14. The communication system according to claim 1,
wherein the server further comprises a storage device configured to store the plurality of pieces of operation definition information.

15. The communication system according to claim 1,
wherein the first controller is further configured to receive the shortcut information from the mobile terminal device via the first network interface using near-field wireless communication.

16. The communication system according to claim 1,
wherein the first controller is further configured to, in response to near-field wireless communication being established between the first network interface and the mobile terminal device, receive the shortcut information from the mobile terminal device via the first network interface using the near-field wireless communication.

17. The communication system according to claim 1,
wherein the first controller is further configured to set the first network interface into a receivable state where the first network interface is allowed to receive the shortcut information via near-field wireless communication from the mobile terminal device.

18. An image processing apparatus comprising:
an image processor;
a communication interface configured to communicate with a server via an Internet;
a network interface configured to perform wireless communication with a mobile terminal device, using a wireless communication protocol;
an operation interface; and
a controller configured to execute a coordinated operation by sequentially performing a plurality of unit operations included in the coordinated operation, the plurality of unit operations being respectively defined by a plurality of pieces of operation definition information sequentially received from the server, the controller being further configured to:
execute the coordinated operation by:
receiving N-th operation definition information of the plurality of pieces of operation definition information from the server via the communication interface, N being a variable natural number equal to or more than one, the N-th operation definition information being for defining an N-th unit operation included in the coordinated operation;

determining which one of an option selecting instruction and an operation instruction is included in the received N-th operation definition information;

in response to determining that the N-th operation definition information includes the option selecting instruction to select one of options selectable in the coordinated operation, setting the operation interface into an acceptable state where the operation interface is allowed to accept an option selecting operation to select one of the selectable options;

in response to accepting the option selecting operation via the operation interface, transmitting next-operation request information to the server via the communication interface, the next-operation request information being for requesting the server to transmit (N+1)th operation definition information that defines an (N+1)th unit operation following the N-th unit operation in the coordinated operation; and in response to determining that the N-th operation definition information includes the operation instruction that instructs the image processor to perform image processing, controlling the image processor to perform image processing as instructed by the operation instruction, in accordance with the selected option;

set the network interface into a receivable state where the network interface is allowed to receive shortcut information from the mobile terminal device, the shortcut information indicating that the coordinated operation is started from an M-th unit operation of the plurality of unit operations, the M-th unit operation being defined by M-th operation definition information, M being a specific natural number equal to or more than two; and in response to receiving the shortcut information from the mobile terminal device via the network interface, transmit the received shortcut information to the server via the communication interface.

19. The image processing apparatus according to claim 18,
wherein the controller comprises:
a processor; and
a memory storing processor-executable instructions configured to, when executed by the processor, cause the processor to:
execute the coordinated operation by:
receiving the N-th operation definition information;
determining which one of the option selecting instruction and the operation instruction is included in the received N-th operation definition information;
in response to determining that the N-th operation definition information includes the option selecting instruction, setting the operation interface into the acceptable state;
in response to accepting the option selecting operation via the operation interface, transmitting the next-operation request information to the server via the communication interface; and
in response to determining that the N-th operation definition information includes the operation instruction, controlling the image processor to perform image processing as instructed by the operation instruction, in accordance with the selected option;
set the network interface into the receivable state; and
in response to receiving the shortcut information from the mobile terminal device via the network interface, transmit the received shortcut information to the server via the communication interface.

20. A server comprising:
a storage configured to store a plurality of pieces of operation definition information;
a communication interface configured to communicate with an external device via an Internet; and
a controller configured to cause an image processing apparatus to execute a coordinated operation, by sequentially transmitting the plurality of pieces of operation definition information stored in the storage, the coordinated operation comprising a plurality of unit operations, the plurality of unit operations being respectively defined by the plurality of pieces of operation definition information, the controller being further configured to:
receive coordinated-operation request information from the image processing apparatus via the communication interface;
in response to receiving the coordinated-operation request information, transmit acquisition instruction information to the image processing apparatus via the communication interface, the acquisition instruction information being for instructing the image processing apparatus to receive shortcut information via wireless communication, the shortcut information indicating that the coordinated operation is started from an M-th unit operation of the plurality of unit operations, the M-th unit operation being defined by M-th operation definition information, M being a specific natural number equal to or more than two;
receive the shortcut information from the image processing apparatus via the communication interface; and
in response to receiving the shortcut information, transmit the M-th operation definition information to the image processing apparatus via the communication interface.

21. The server according to claim 20,
wherein the controller comprises a processor configured to, when executing processor-executable instructions stored in the storage, perform:
receiving the coordinated-operation request information from the image processing apparatus via the communication interface;
in response to receiving the coordinated-operation request information, transmitting the acquisition instruction information to the image processing apparatus via the communication interface;
receiving the shortcut information from the image processing apparatus via the communication interface; and
in response to receiving the shortcut information, transmitting the M-th operation definition information to the image processing apparatus via the communication interface.

22. A mobile terminal device configured to cause an image processing apparatus to execute a coordinated operation, the coordinated operation comprising a plurality of unit operations that are defined by a plurality of pieces of operation definition information, respectively, the mobile terminal device comprising:

a user interface;

a storage configured to store shortcut information, the shortcut information indicating that the coordinated operation is started from an M-th unit operation of the plurality of unit operations, the M-th unit operation being defined by M-th operation definition information, M being a specific natural number equal to or more than two, the shortcut information comprising:

identification information that identifies the M-th operation definition information; and option information indicating one or more particular options, the one or more particular options comprising one or more options that are selectable in each unit operation of first to (M-1)th unit operations and are to be used in each unit operation of the M-th and following unit operations;

a network interface configured to communicate with an external device, using a wireless communication protocol; and a controller configured to:

accept, via the user interface, a shortcut selecting operation to select the shortcut information stored in the storage;

determine whether the shortcut information selected by the accepted shortcut selecting operation contains all of the option information necessary for the selected shortcut information;

in response to determining that the shortcut information selected by the first shortcut selecting operation does not contain all of the option information necessary for the selected shortcut information, acquire necessary option information that is not contained in the shortcut information; and transmit the shortcut information containing the identification information and all of the necessary option information, to the image processing apparatus via the network interface.

23. The mobile terminal device according to claim 22, wherein the controller comprises a processor configured to, when executing processor-executable instructions stored in the storage, perform:

accepting the shortcut selecting operation via the user interface;

determining whether the shortcut information selected by the accepted shortcut selecting operation contains all of the option information necessary for the selected shortcut information;

in response to determining that the shortcut information selected by the first shortcut selecting operation does not contain all of the option information necessary for the selected shortcut information, acquiring the necessary option information that is not contained in the shortcut information; and transmitting the shortcut information containing the identification information and all of the necessary option information, to the image processing apparatus via the network interface.

* * * * *